United States Patent
Kim et al.

(10) Patent No.: US 10,007,425 B2
(45) Date of Patent: Jun. 26, 2018

(54) MOBILE TERMINAL AND MODIFIED KEYPAD USING METHOD THEREOF

(71) Applicant: LG ELECTRONICS INC., Seoul (KR)

(72) Inventors: Mina Kim, Seoul (KR); Byoungjoo Kwak, Seoul (KR); Hosung Song, Seoul (KR); Keansub Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 14/167,789

(22) Filed: Jan. 29, 2014

(65) Prior Publication Data
US 2014/0281995 A1 Sep. 18, 2014

(30) Foreign Application Priority Data
Mar. 15, 2013 (KR) .......... 10-2013-0028211

(51) Int. Cl.
| | |
|---|---|
| *G06F 3/0488* | (2013.01) |
| *G06F 3/01* | (2006.01) |
| *G06F 3/16* | (2006.01) |
| *G06F 17/27* | (2006.01) |
| *G06F 17/24* | (2006.01) |
| *G06F 17/28* | (2006.01) |
| *G06F 9/451* | (2018.01) |
| *G10L 15/00* | (2013.01) |

(52) U.S. Cl.
CPC .......... *G06F 3/04886* (2013.01); *G06F 3/018* (2013.01); *G06F 3/04883* (2013.01); *G06F 3/167* (2013.01); *G06F 9/454* (2018.02); *G06F 17/242* (2013.01); *G06F 17/273* (2013.01); *G06F 17/2863* (2013.01); *G10L 15/005* (2013.01)

(58) Field of Classification Search
CPC ............. G06F 3/04886; G06F 3/04883; G06F 3/0233; G06F 3/0238
USPC ........................................ 715/719, 771, 773
See application file for complete search history.

(56) References Cited

U.S. PATENT DOCUMENTS

| | | | | |
|---|---|---|---|---|
| 7,581,194 | B2 * | 8/2009 | Iwema | G06F 3/0488 715/810 |
| 9,230,160 | B1 * | 1/2016 | Kanter | G06K 9/00355 |
| 2005/0141770 | A1 | 6/2005 | Marila et al. | |
| 2008/0077393 | A1 | 3/2008 | Gao et al. | |
| 2008/0225014 | A1 * | 9/2008 | Kim | G06F 3/04886 345/173 |

(Continued)

FOREIGN PATENT DOCUMENTS

| | | |
|---|---|---|
| CN | 1637695 A | 7/2005 |
| CN | 102098370 A | 6/2011 |

*Primary Examiner* — Christopher J Fibbi
(74) *Attorney, Agent, or Firm* — Birch, Stewart, Kolasch & Birch, LLP

(57) ABSTRACT

A method of controlling a mobile terminal, and which includes displaying an application screen of an executing application and a corresponding keypad on a display of the mobile terminal; modifying, via a controller of the mobile terminal, the keypad into a new keypad arrangement; displaying, via the controller, a display window in a vacant space created by the modification of the keypad, wherein a function of the display window is automatically selected based on a type of the executing application; and inputting text on the displayed application screen through the display window and modified keypad.

13 Claims, 25 Drawing Sheets

(56) References Cited

U.S. PATENT DOCUMENTS

| | | | |
|---|---|---|---|
| 2008/0267361 A1* | 10/2008 | Dileo | H04M 11/085 379/52 |
| 2008/0297480 A1* | 12/2008 | Lee | G06F 3/018 345/169 |
| 2009/0270078 A1 | 10/2009 | Nam et al. | |
| 2011/0018812 A1* | 1/2011 | Baird | G06F 3/04886 345/173 |
| 2011/0285635 A1* | 11/2011 | Ohki | G06F 3/0219 345/171 |
| 2012/0113023 A1 | 5/2012 | Koch et al. | |
| 2012/0116559 A1 | 5/2012 | Davis et al. | |
| 2012/0117506 A1* | 5/2012 | Koch | G06F 3/04886 715/773 |
| 2012/0224743 A1* | 9/2012 | Rodriguez | G06T 11/60 382/103 |
| 2013/0021260 A1* | 1/2013 | Hwang | G06F 3/018 345/171 |
| 2013/0038521 A1* | 2/2013 | Sugaya | G06F 3/0304 345/156 |
| 2013/0120271 A1* | 5/2013 | Lee | G06F 3/0482 345/168 |
| 2014/0035823 A1* | 2/2014 | Khoe | G06F 3/02 345/171 |

\* cited by examiner

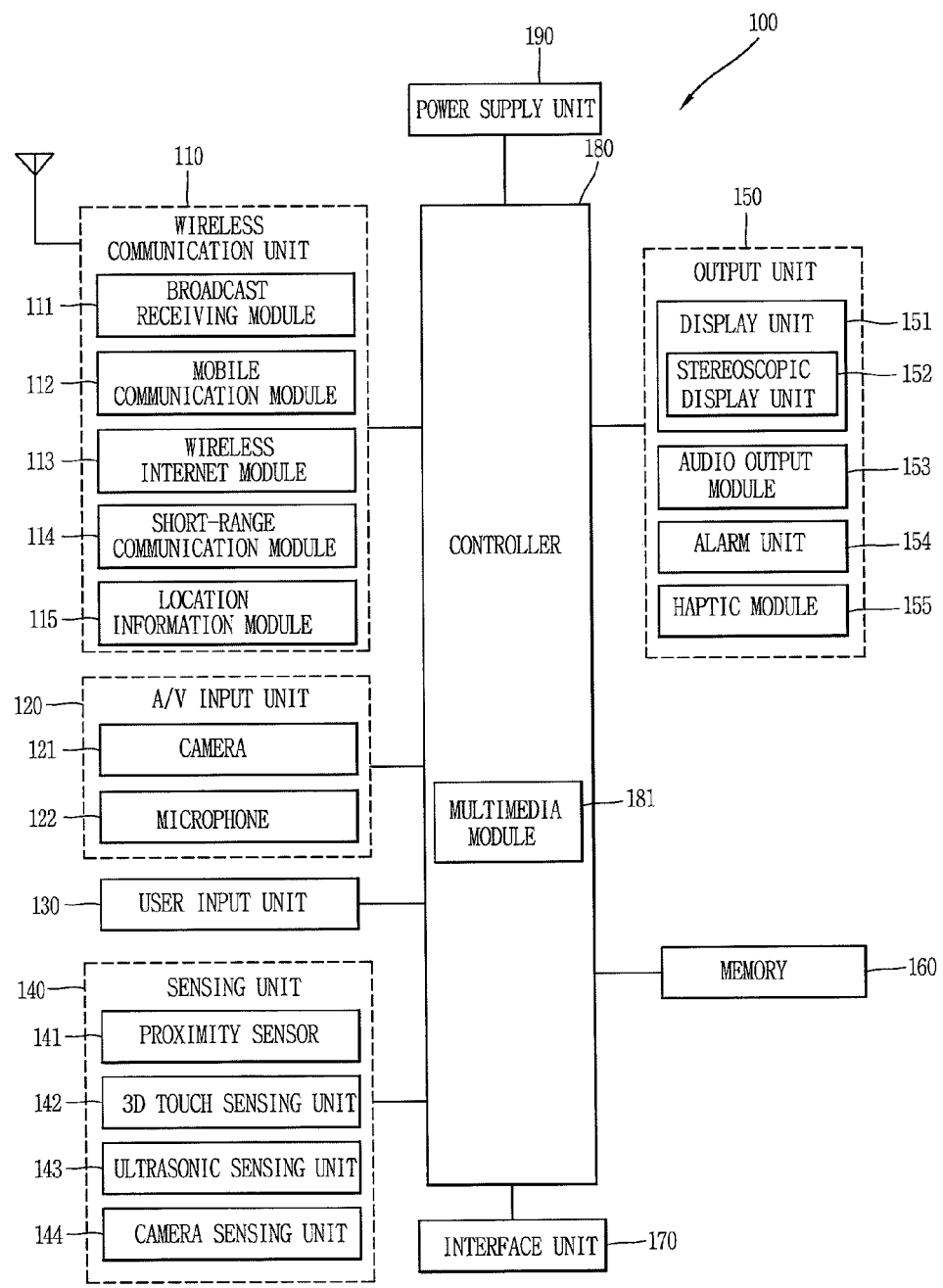

FIG. 8A
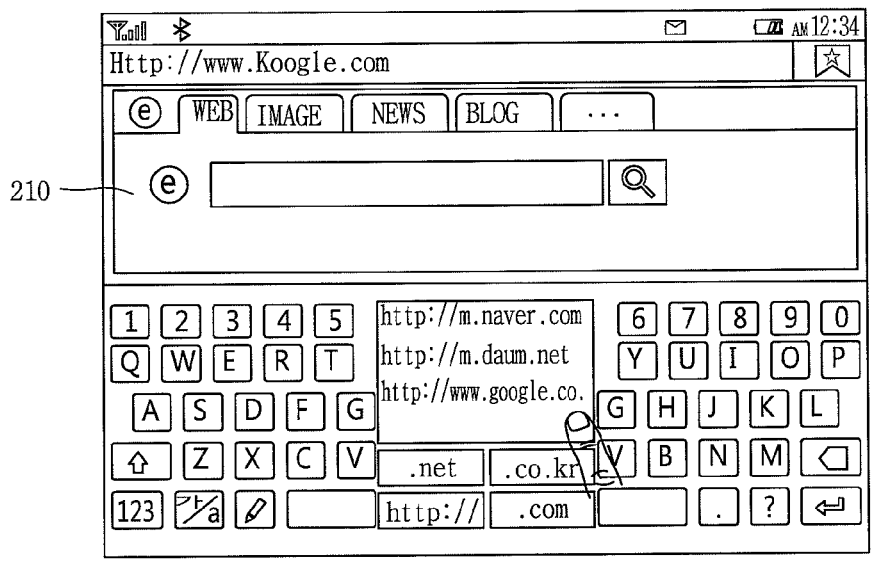
DISPLAY URL INFORMATION ON THE DISPLAY WINDOW
⇩
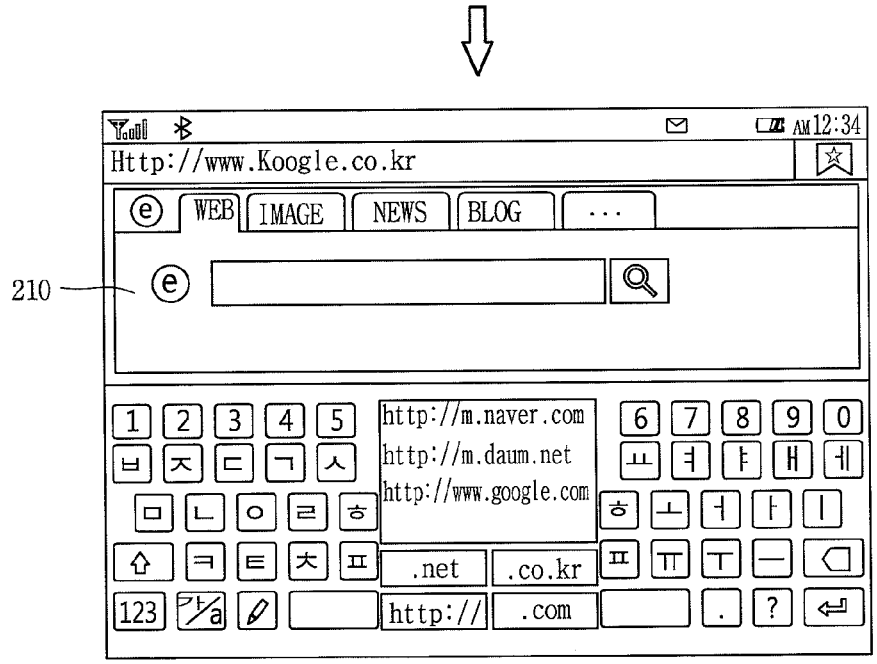
CHANGE KEYBOARD LANGUAGE (ENGLISH-KOREAN)

DISPLAY EMOTICON ON THE DISPLAY WINDOW

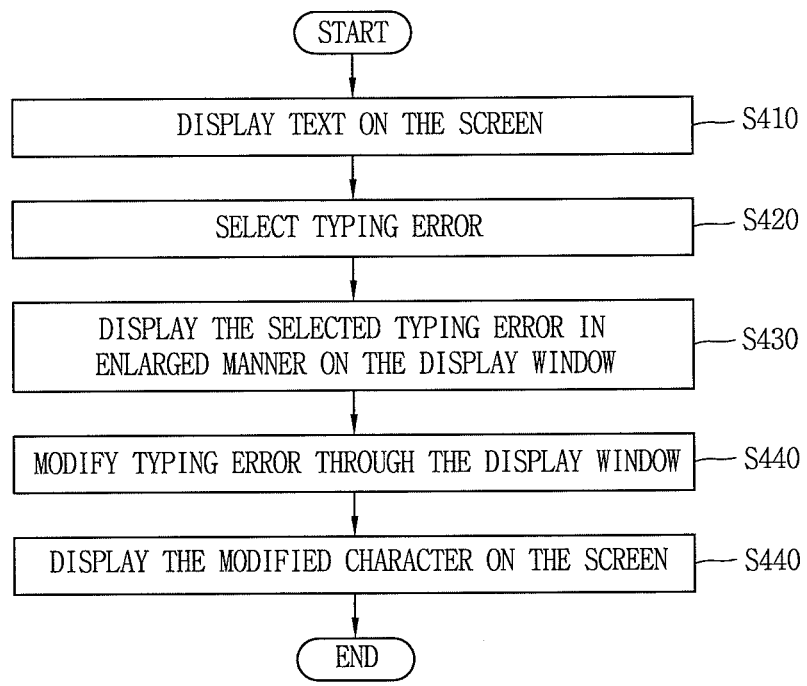

MOVE CURSOR IN THE UNIT OF PHONEME

FIG. 15A
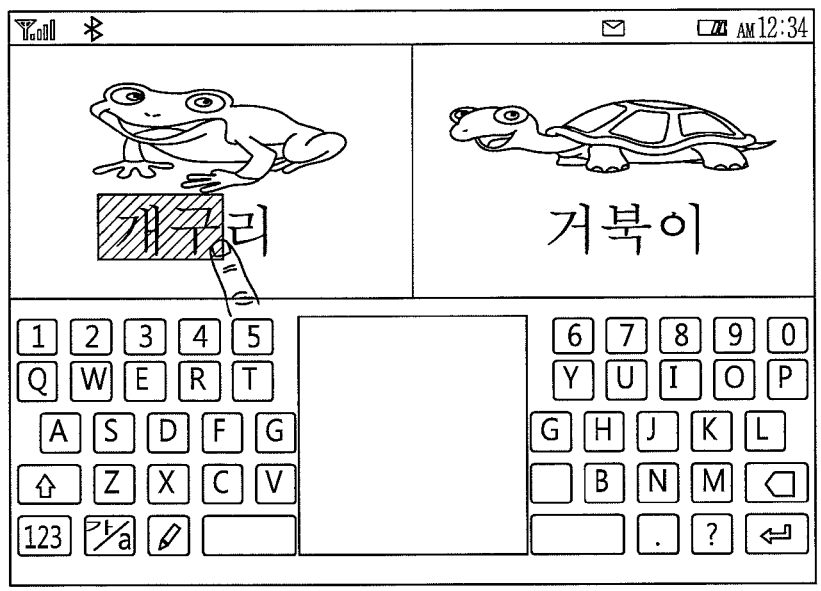
SELECT TEXT ON THE SCREEN
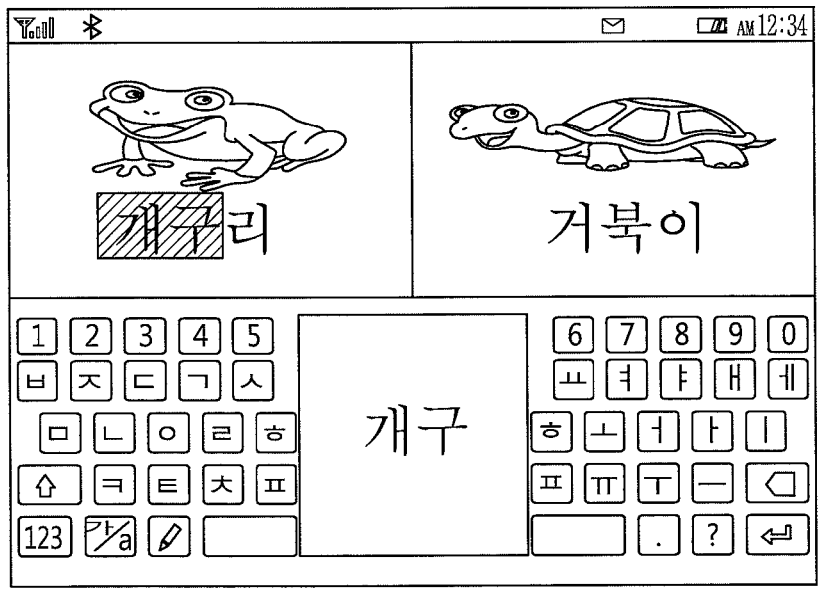
DISPLAY TEXT IN ENLARGED MANNER ON
THE DISPLAY WINDOW AND CHANGE KEYBOARD
(ENGLISH - KOREAN)

FIG. 15B
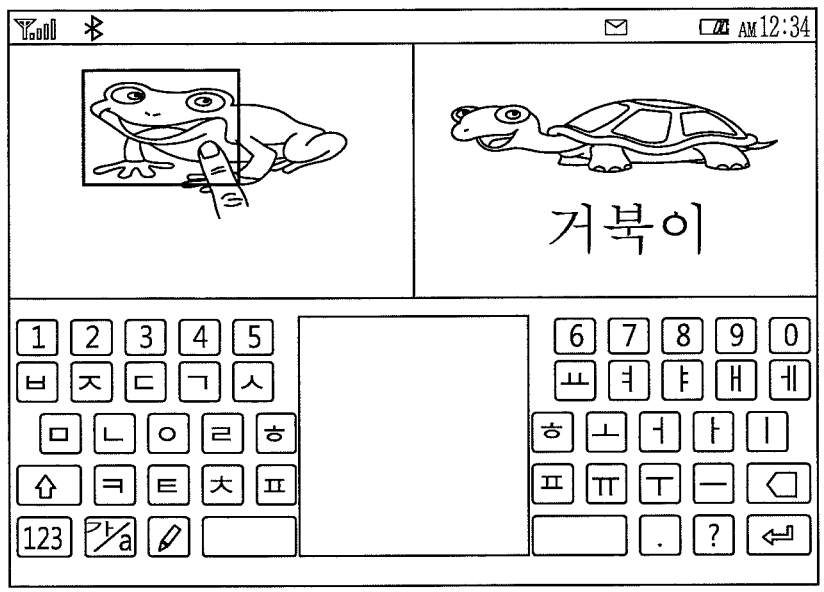
SELECT IMAGE ON THE SCREEN
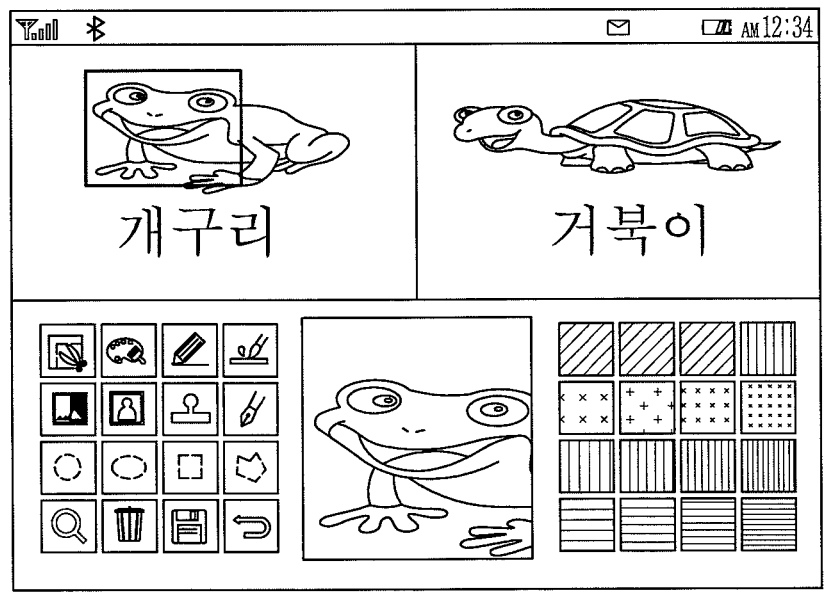
DISPLAY IMAGE IN ENLARGED MANNER ON
THE DISPLAY WINDOW AND CHANGE KEYBOARD
TO DRAWING TOOL

DISPLAY SUBTITLE ON THE DISPLAY WINDOW

DISPLAY PICTURE ON THE DISPLAY WINDOW

MOBILE TERMINAL AND MODIFIED KEYPAD USING METHOD THEREOF

CROSS-REFERENCE TO RELATED APPLICATION

Pursuant to 35 U.S.C. § 119(a), this application claims the benefit of earlier filing date and right of priority to Korean Application No. 10-2013-0028211, filed on Mar. 15, 2013, the contents of which is incorporated by reference herein in its entirety.

BACKGROUND OF THE INVENTION

1. Field of the Invention

The present invention relates to a mobile terminal and a modified keypad operation method thereof for displaying a display window in a vacant space created during the modification (split or slide) of a keypad to easily perform a text input to an edit object through the display window.

2. Description of the Related Art

A mobile terminal can perform various functions such as a data and voice communication function, a photo or video capture function through a camera, a voice storage function, a music file reproduction function through a speaker system, an image or video display function, a game function, and thus is implemented as a multimedia player. Moreover, mobile terminals can receive broadcast or multicast signals to allow the user to view video or television programs.

Mobile terminals have also evolved to display 3-dimensional (3D) stereoscopic images allowing depth perception and stereovision exceeding the level of displaying two-dimensional images. Accordingly, a trend of producing contents in 3D images even in a mobile terminal has been emerged as well as movies and TV contents.

The mobile terminal may include a touch screen to perform a complex function to which the foregoing various functions are added, and a basic keypad (or keyboard) may be displayed on the touch screen while inputting text. The basic keypad may include a plurality of keys indicating languages (Korean, English, etc.), a plurality of keys indicating special characters (symbols, numerals, emoticons), a Shift key, an Enter key, and other keys. Accordingly, the user can enter text (memo, text message) using the basic keypad.

However, according to the related art, the user has to touch a lot of keys to correspond to each character when entering a long text message. Furthermore, a distance between keys is generally small and the user often has many typing errors because of the thickness of their thumb or other finger when touching keys on the keypad. Thus, when a typing error occurs in the middle portion of the text, the user as to remove all the characters subsequent to the typing error and enter them again.

In addition, for a hearing impaired person, a video phone call using a sign language can be used, but transferring the meaning using a sign language and understanding the meaning of the sign language is difficult because the methods of expressing sign languages are different. In some instance, the basic keypad can include multiple keypads, but operating the multiple keypads is cumbersome and time consuming. The space utilization of the basic keypad is also limited an inconvenient.

SUMMARY OF THE INVENTION

Accordingly, an object of the present invention is to provide a mobile terminal and a modified keypad operation method thereof for using a vacant space created during the modification of a keypad as a display window to easily perform a text input.

Another object of the present invention is to provide a mobile terminal and a modified keypad operation method thereof capable of interlocking a display window created during the modification of a keypad with an edit object and the keypad to perform various functions.

To achieve these and other advantages and in accordance with the purpose of the present invention, as embodied and broadly described herein, the present invention provides in one aspect a method of controlling a mobile terminal, and which includes displaying an application screen of an executing application and a corresponding keypad on a display of the mobile terminal; modifying, via a controller of the mobile terminal, the keypad into a new keypad arrangement; and displaying, via the controller, a display window in a vacant space created by the modification of the keypad. Further, a function of the display window is automatically selected based on a type of the executing application; and inputting text on the displayed application screen through the display window and modified keypad.

In another aspect, the present invention provides a mobile terminal including a display configured to display an application screen of an executing application and a corresponding keypad; and a controller configured to modify the keypad into a new keypad arrangement, display a display window in a vacant space created by the modification of the keypad, wherein a function of the display window is automatically selected based on a type of the executing application, and display text on the displayed application screen through the display window and modified keypad.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a mobile terminal according to an embodiment of the present invention;

FIGS. 8A through 8D are views illustrating a specific embodiment of an application based interlocking operation;

FIG. 11 is a flow chart illustrating a typing error correction method through a display window;

FIGS. 15A and 15B are views illustrating an example of a keypad operation method according to a content analysis within an image.

DETAILED DESCRIPTION OF THE INVENTION

Figure 2A:
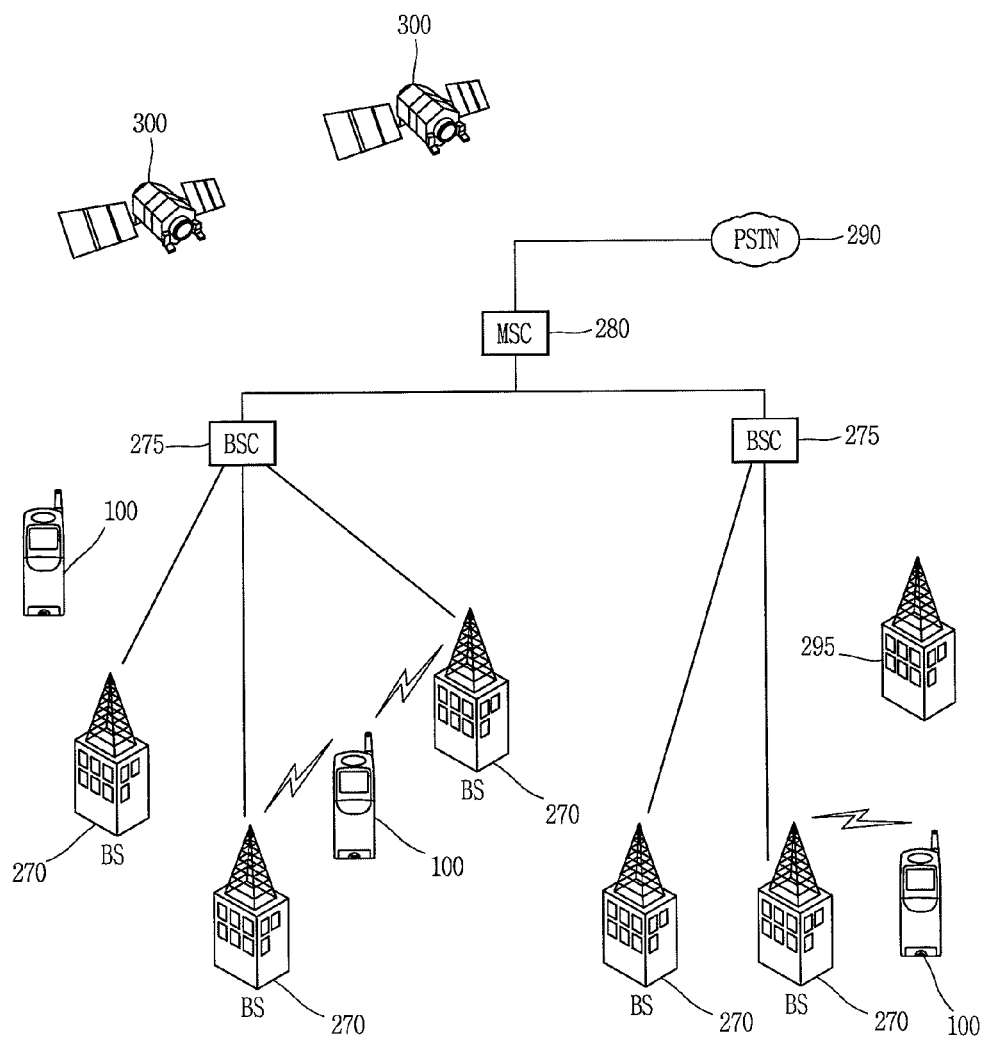
FIG. 2A is a block diagram illustrating a wireless communication system in which a mobile terminal according to an embodiment of the present invention can be operated.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment of the present invention. The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the mobile communication terminal may be implemented with greater or less number of elements than those illustrated elements.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems. Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement a video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (Wi-Fi) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image. Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Further, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this instance, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, an ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound. For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor. For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

In another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input performed on the touch screen as text or image. In addition, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For a software implementation, the embodiments such as procedures or functions described in the present invention may be implemented with separate software modules. Each of the software modules may perform at least one function or operation described in the present invention. Software codes can be implemented by a software application written in any suitable programming language. The software codes may be stored in the memory 160 and executed by the controller 180.

Figure 2B:
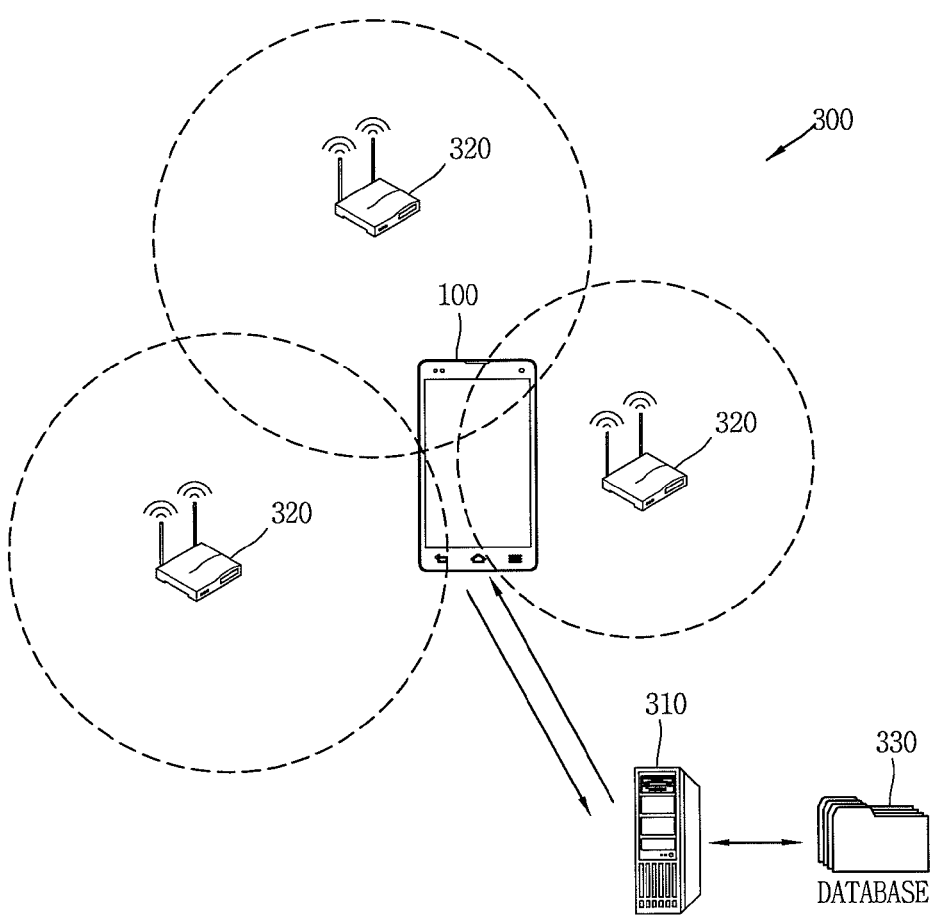
FIG. 2B is a configuration diagram illustrating a Wi-Fi location tracking system in which a mobile terminal according to an embodiment of the present invention can be operated.

Next, a communication system that can be implemented through the mobile terminal 100 according to the present invention will be described. FIGS. 2A and 2B are conceptual views illustrating a communication system in which a mobile terminal 100 according to the present invention is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this instance, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, he mobile terminals 100 may perform calls, message transmissions and receptions, and other communication operations. Each reverse-link signal received by a specific base station 270 may be processed within that specific base station 270. The processed resultant data may be transmitted to an associated BSC 275.

The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a Wi-Fi (Wireless Fidelity) positioning system (WPS) will be described with reference to FIG. 2B. The Wi-Fi positioning system (WPS) 300 refers to a location determination technology based on a wireless local area network (WLAN) using Wi-Fi as a technology for tracking the location of the mobile terminal 100 using a Wi-Fi module provided in the mobile terminal 100 and a wireless access point 320 for transmitting and receiving to and from the Wi-Fi module.

The Wi-Fi positioning system 300 may include a Wi-Fi location determination server 310, a mobile terminal 100, a wireless access point (AP) 320 connected to the mobile terminal 100, and a database 330 stored with any wireless AP information.

The Wi-Fi location determination server 310 extracts the information of the wireless AP 320 connected to the mobile terminal 100 based on a location information request message (or signal) of the mobile terminal 100. The information of the wireless AP 320 may be transmitted to the Wi-Fi location determination server 310 through the mobile terminal 100 or transmitted to the Wi-Fi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The Wi-Fi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

Referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the Wi-Fi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

Further, any wireless AP information and location information corresponding to the any wireless AP are stored together in the database 330, and thus the Wi-Fi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

In addition, the extracted location information of the mobile terminal 100 may be transmitted to the mobile terminal 100 through the Wi-Fi location determination server 310, thereby acquiring the location information of the mobile terminal 100.

Figure 3A:
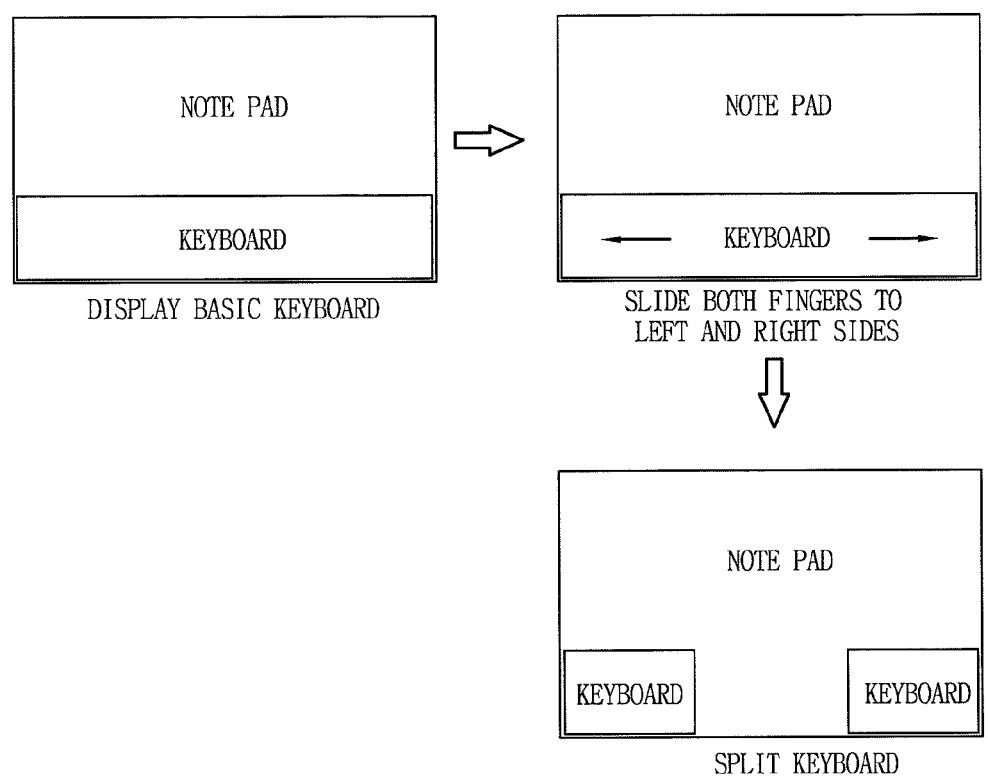
FIGS. 3A and 3B are views illustrating a keypad modification method.
Figure 3B:
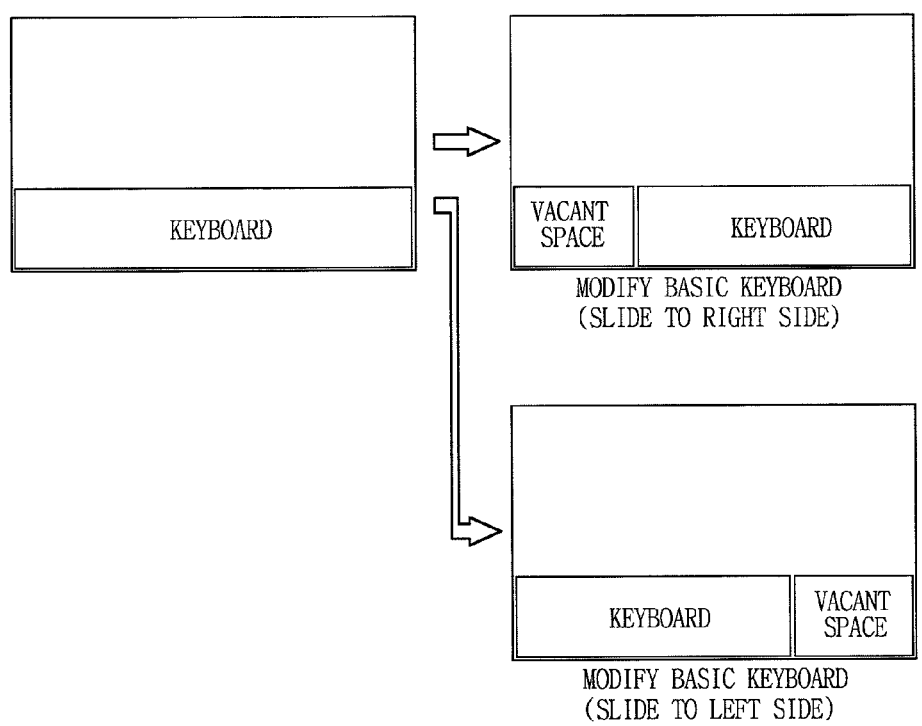

FIG. 3A is an example of a keypad split method, and FIG. 3B is an example of a keypad slide method. As illustrated in FIG. 3A, when an edit object (e.g., memo) is selected by the user, the controller 180 displays a basic keypad (or keyboard) for entering text at a lower end portion of the screen while at the same time displaying a note pad on the screen.

In this instance, when both fingers are touched and slid to the left and right sides on the keypad, the keypad is split and displayed on left and right sides. When dividing the keypad, the keypad and characters and symbols contained in the keypad may be reduced in a predetermined proportion.

Further, the keypad split method is not limited to this as an example, and various split methods may be also applicable thereto. The user may enter his or her desired text in a note pad using the split keypads, and slide the split keypads back to the center to combine the split keypads into one.

In addition, as illustrated in FIG. 3B, the size and location of the keypad may be modified by taking the user's convenience into consideration. For example, the keypad slide generally occurs according to the how the user grips the terminal. Thus, the keypad may be slid and displayed on the right side when the user holds the terminal in their right hand, and the keypad may be slid and displayed on the left side when the user holds the terminal is their left hand. The size of the keypad can also be reduced.

However, when the keypad is split or slid to one side (left/right or top/bottom), a vacant space is formed at the central portion or on the left and right sides (the vacant space is a temporarily created region). In addition, the vacant space is displayed or processed with a gray color but not used in a separate way.

Accordingly, embodiments of the present invention provide methods for easily performing various editing operations (input, modify and delete) for text, images, and videos using the created vacant space.

Figure 4:
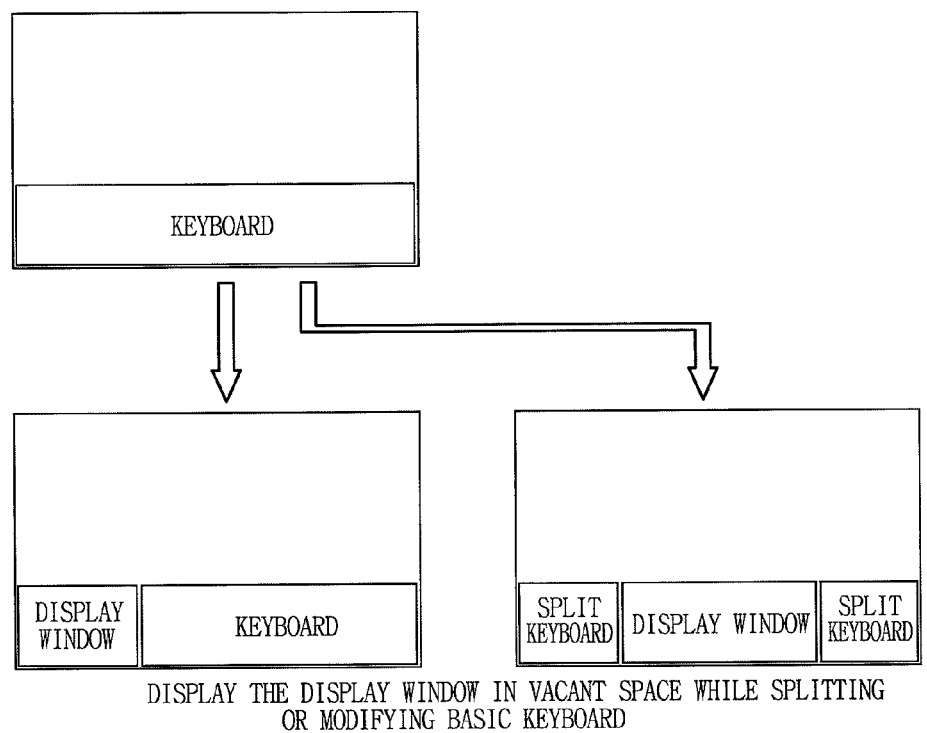
FIG. 4 is a conceptual view illustrating a keypad application method according to an embodiment of the present invention.

In more detail, FIG. 4 is a conceptual view illustrating a keypad application method according to an embodiment of the present invention. As illustrated in FIG. 4, the operation of inputting (handwriting, memo, voice), outputting (text, image) and editing (text modification, delete, insert) desired information through a display window is performed using a vacant space temporarily formed during the keypad split or keypad modification as the display window.

In this instance, the display window performs various functions in interlocking with the content display area (screen) and split keypad. Accordingly, the term "modified keypad" according to the present invention includes both a keypad split state and a keypad slid state.

Modified Keypad Structure

Figure 5A:
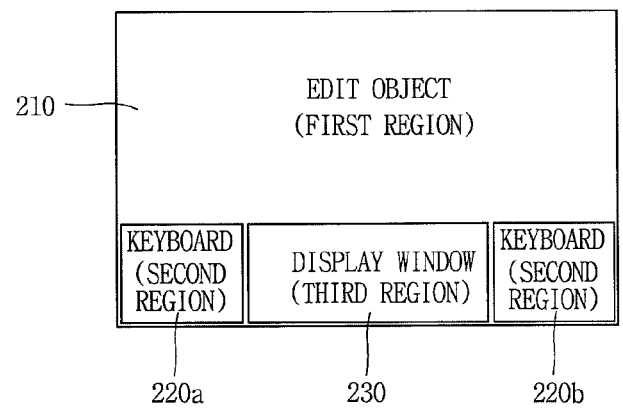
FIGS. 5A and 5B are configuration diagrams illustrating a modified keypad according to an embodiment of the present invention.
Figure 5B:
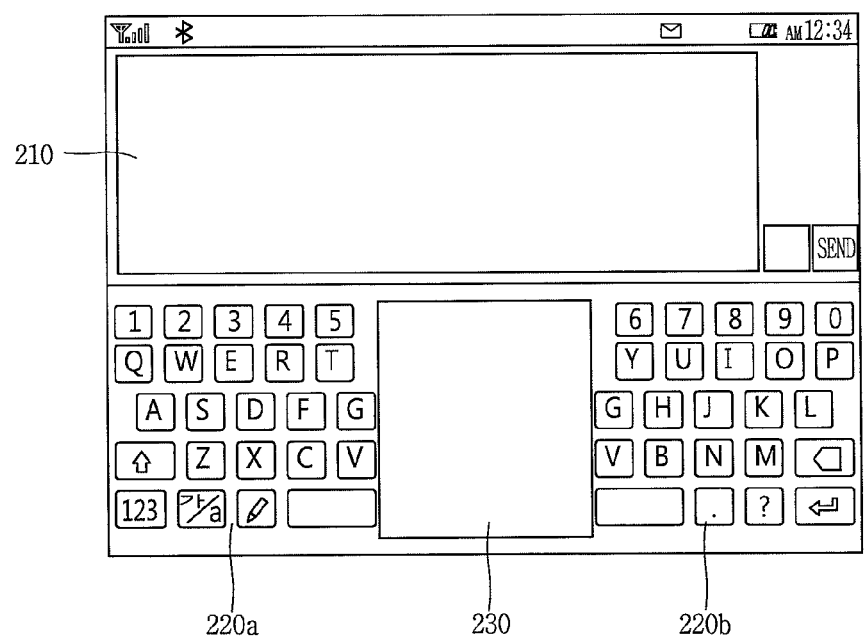

FIGS. 5A and 5B are configuration diagrams of a modified keypad according to an embodiment of the present invention, thus illustrating keypad configuration screens during the keypad split.

As illustrated in FIGS. 5A and 5B, a modified keypad screen may include a first region displayed with an edit object 210, a second region displayed with split keypads 220a, 220b, and a third region displayed with a new display window 230 during the keypad split.

The first region displays an application and various contents subjected to editing and searching. The application displayed in the first region 210 may include a messenger, a web search, a memo, an image/video/PDF editor, or the like, and the contents may include text, images, and videos.

As split keypads, the keypads 220a, 220b displayed in the second region may be displayed at both the left and right sides or displayed at only either one thereof according to the split scheme. The keypads 220a, 220b may include a plurality of keys indicating a specific language (e.g., Korean or English) and a plurality of keys indicating specific characters (symbols, numerals, emoticons). The size of the keypads 220a, 220b may be determined according to the split ratio.

The use object of the display window 230 displayed in the third region is determined according to the edit object and application displayed in the first region to perform an interlocking function associated with the edit object 210 and keypads 220a, 220b, for example, handwriting, voice, gesture (motion), eye-tracking, and finger tracking.

The location of the keypads 220a, 220b may be located at the center or left/right side based on the horizontal direction according the split scheme, and displayed at the center or top/bottom side in the vertical direction according to the gripping location.

Further, the display window 230 may be based on a rectangular shape, but displayed in various shapes according to the user's setting, and the size thereof may be changed based on the split ratio and enlargement/reduction ratio of the keypads 220a, 220b. In particular, when the keypad is displayed at only one side, the size of the display window 230 may be changed in the top/bottom/left/right side direction. The display location of the display window is displayed at the location of a finger sensed by a grip sensor.

FIGS. 5A and 5B illustrate a modified keypad screen structure during the keypad split, but the present invention is not limited to this. That is, the present invention is also applicable the display window being disposed in a space created by sliding the keypad to one side.

Keypad Modification (Display Window Display) Method

According to an embodiment of the present invention, the display window 230 is displayed during the split of the keypad or basic keypad modification. In other words, the display window 230 is displayed when using a phone, a dial, a phone book search, a navigation, a message/email, an Internet/web search, a kakao talk/messenger or splitting a keypad to enhance the efficiency of entering text. The operation of displaying the display window 230 is referred to as a keypad modification in the present invention.

The display window 230 may be displayed according to the user's split input or otherwise automatically displayed according to the initial screen setting, for example, a mounting method (desktop/handheld), a display mode (horizontal or vertical), a gripping direction (left hand, right hand, both hands) or a gripping location (top end, bottom end).

The user's split input includes a slide operation using his or her finger (one hand, two hands, both hands) and a specific key (for example, space bar double touch) input. Furthermore, the display window 230 may be displayed according to the desktop mode or handheld mode.

a. Desktop Mode

In the desktop mode, the user can split a keypad through a two finger slide. During the keypad split, the controller 180 changes the keypad to display the display window 230, and recognizes the location of a finger to automatically configure an optimal keypad location as illustrated in FIG. 4.

b. Handheld Mode

In the handheld mode, the controller 180 can automatically split the keypad as illustrated in FIG. 4B, when the user holds an initial screen with his or her hand. Furthermore, the controller 180 splits the screen according to a double click on the space bar, a terminal shaking motion, a finger's (one hand, two hands) slide operation (drag) to display the keypads 220a, 220b and display window 230 as illustrated in FIG. 4B.

When changing the keypad, the controller 180 recognizes the gripping direction (both hands, right hand, left hand) and gripping location (top end, bottom end) using a grip sensor and then displays the split keypads 220a, 220b and display window 230 at the recognized location.

The modified keypad by the foregoing operation is restored to the basic keypad during the mode change. For example, when it is changed from the handheld mode to the desktop mode, keypads 220a, 220b at the left and right sides are combined into a basic keypad and the display window 230 disappears. The similar operation can be applied when the desktop mode is changed to the handheld mode. Furthermore, when the keypad is changed by the user's finger slide operation, it may be displayed with a basic keypad again by sliding the split keypads 220a, 220b in the opposite directions.

Display after Keypad Modification

According to an embodiment of the present invention, a modified keypad can be ergonomically displayed in various shapes based on the finger used location as well as in a rectangular shape. In particular, when it is split and used as a dual display, two keypads may be displayed, thereby allowing two persons to perform a game, a messenger, or the like using their own keypads, respectively, on one screen.

In particular, for a horizontal mode, a keypad can be displayed at one side, and symbols (e.g., arrows) at the other side, and thus a key arrangement for the left and right hands can be disposed in a different manner to move each key of the keypad, thereby allowing a user's frequently used key to be moved to a specific direction, for example, to the split left side keypad 220a by selecting a specific key or key group of the right side keypad 220b.

Interlocking Operation Through Display Window

According to an embodiment of the present invention, the display window 230 displayed in the third region is interlocked with the edit object 210 displayed in the first region and the keypads 220a, 220b displayed in the second region, thereby performing various interlocking functions.

The interlocking function includes handwriting, voice, gesture (motion), eye-tracking, finger tracking, etc. The interlocking function includes a first interlocking function between the first region 210 and the third region 230, a second interlocking function between the third region 230 and the second region 220a, 220b, and a third interlocking function between the first and the third region 210, 230 and the second region 220a, 220b.

The first interlocking function may include a new function addition and a layout optimization to the display window 230 according to the edit object (application or content), and the second interlocking function may include an operation of changing the language and layout of the keypad displayed on the keypads 230a, 230b according to the input scheme (cursive script, voice recognition and sign language) of the display window 230. Furthermore, the third interlocking function may include an operation of changing the language and layout of the keypad displayed on the keypads 230a, 230b according to the selected content when the content displayed on the edit object 210 is selected to display it on the display window 230.

Each interlocking function may be selectively performed based on a content/input scheme, a phoneme unit typing error correction and an image/video content analysis.

Figure 6:
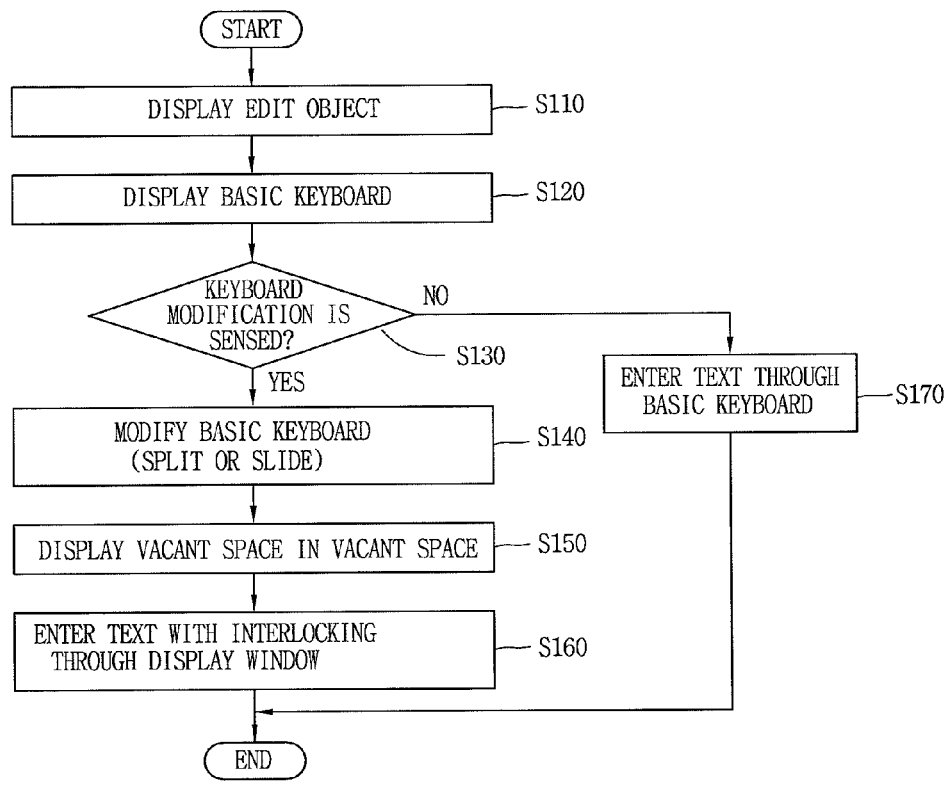
FIG. 6 is a flow chart illustrating a modified keypad operation method of a mobile terminal according to an embodiment of the present invention.

Next, FIG. 6 is a flow chart illustrating a modified keypad operation method of a mobile terminal according to an embodiment of the present invention. As illustrated in FIG. 6, a predetermined edit object 210 stored in the memory 160 is displayed in the first region (screen) of the display unit 151 (S110). As the content of text or images (still images, moving images), the edit object is displayed while writing a message, searching a web, writing a memo, or driving an image/video/PDF editor.

When an edit object is displayed on the screen, a basic keypad is displayed in the second region located at a preset location, namely, a bottom portion of the screen (S120). When a keypad modification (split or slide) input is sensed when the edit object 210 and keypads 220a, 220b are displayed (Yes in S130), the controller 180 slides the basic keypad, respectively, according to the keypad modification input, and displays the display window 230 in a vacant space, namely, a third region created by the split or slide of the keypad (S140 and S150).

Further, the controller 180 finds the eyes and finger location using eye tracking and finger tracking and then displays the keypads 220a, 220b and display window 230. In addition, the user inputs at least one of text, a voice and an image to the input window though an interlock between the first region through the third region, thereby performing an editing operation (input, modify and delete) to the display window 230 (S160). The input is performed through handwriting, a voice, and a gesture (motion).

On the contrary, when a keypad modification input is not sensed when the edit object 210 and keypads 220a, 220b are displayed (No in S130), the controller 180 performs a text input to the edit object through the basic keypad (S170). Further, the interlocking operation may be performed according to the edit object and application or otherwise performed according to an input scheme through the display window 230.

Application Based Interlock

Figure 7:
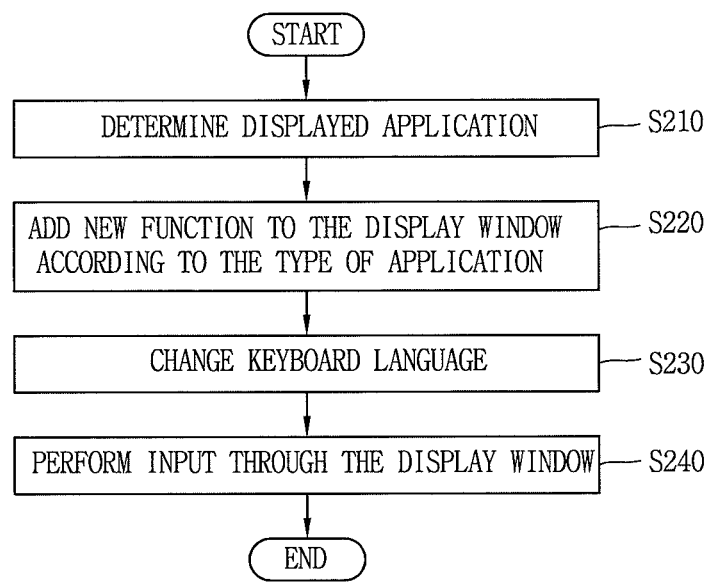
FIG. 7 is a flow chart illustrating an application based interlocking operation.

Next, FIG. 7 is a flow chart illustrating an application based interlocking operation. As described above, when the display window 230 is displayed in the third region by the change of a keypad, the controller 180 determines a type of the application 210 displayed in the first region (S210), and adds a new function to the display window 230 according to the determined type of the application 210 (S220). In other words, the function (object) of the display window 230 is determined according to the type of the application 210.

The new function may include an input function such as handwriting, a voice and a gesture (motion) as well as an additional information display function associated with the application. Furthermore, the controller 180 automatically changes the language of the layout of the keypads 220*a*, 220*b* according to the type of the application (S230).

Accordingly, the user selects additional information through the display window 230 or enters text using handwriting, a voice and a gesture (motion) to perform a search function and an editing operation for the application 210 displayed in the first region (S240).

Figure 8B:
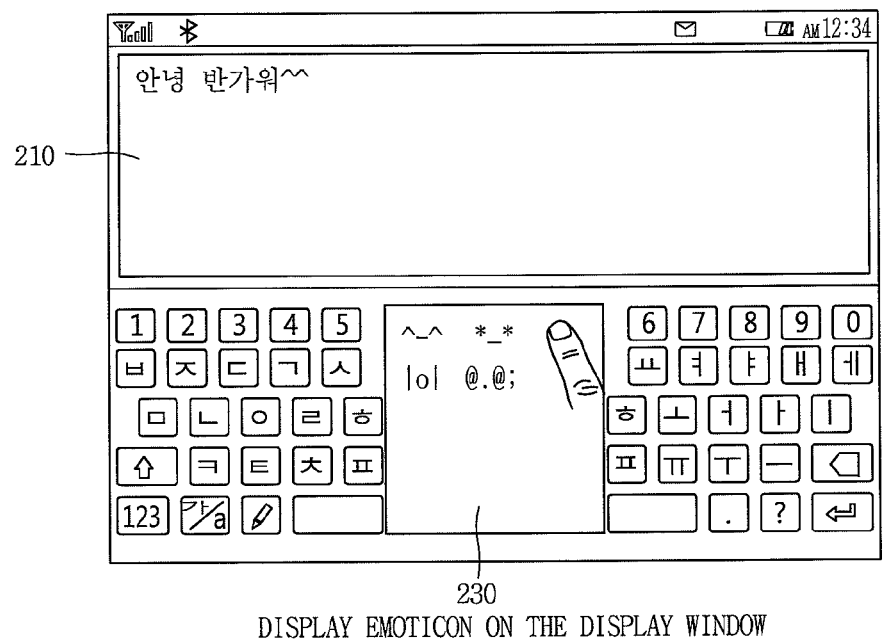

Next, FIGS. 8A through 8D are views illustrating a specific embodiment of an application based interlocking operation. In particular, FIG. 8A illustrates an interlocking operation when a URL search window is activated. When the display window 230 is displayed in the third region by the split of a keypad, the controller 180 determines the type of the application 210 currently displayed in the first region.

As a result of the determination, when the home page (e.g., Koogle.co.kr) is displayed, the controller 180 displays a separate domain button (http://, .net, .com, .co.kr) and at least one or more previously visited home page addresses on the display window 230. The home page addresses may be displayed according to the visited order or displayed according to the user's preferences (for example, number of visits). Only a preset number of home page addresses may be displayed and searched by scrolling.

The user can also select a domain button to access a new home page, and select a specific home page address to access the previously visited home page. Then, the controller 180 recognizes a current URL address displayed in the URL search window to convert the layout language of the keypad displayed in the second region into an English layout when the URL address is "google.com", and convert the English layout into a Korean layout when the URL address is "google.co.kr" as illustrated in FIG. 8A.

Next, FIG. 8B illustrates an interlocking operation when a message or SNS input window is displayed. When the display window 230 is displayed by the split of a keypad, the controller 180 determines the type of the application 210 currently displayed in the first region.

As a result of the determination, when a message or SNS input window is displayed, the controller 180 can display a plurality of emoticons on the display window 230. The controller 180 analyzes the content of text written by the user through a natural language processing to display the most appropriate emoticon to the text at the uppermost portion of the input window.

Accordingly, the user can select and enter a specific emoticon on the display window 230 while entering text into the message or SNS input window through the display window 230 and keypads 220*a*, 220*b*.

Figure 8C:
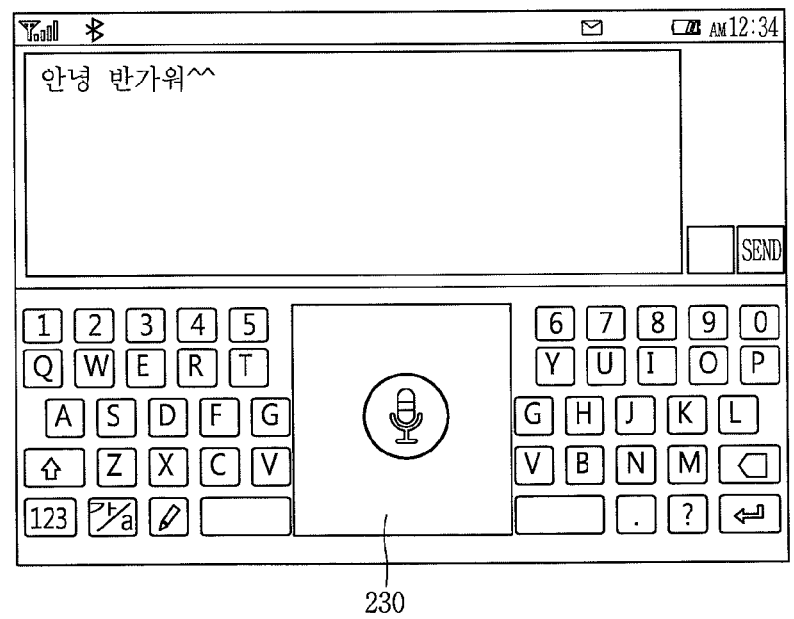
Figure 8D:
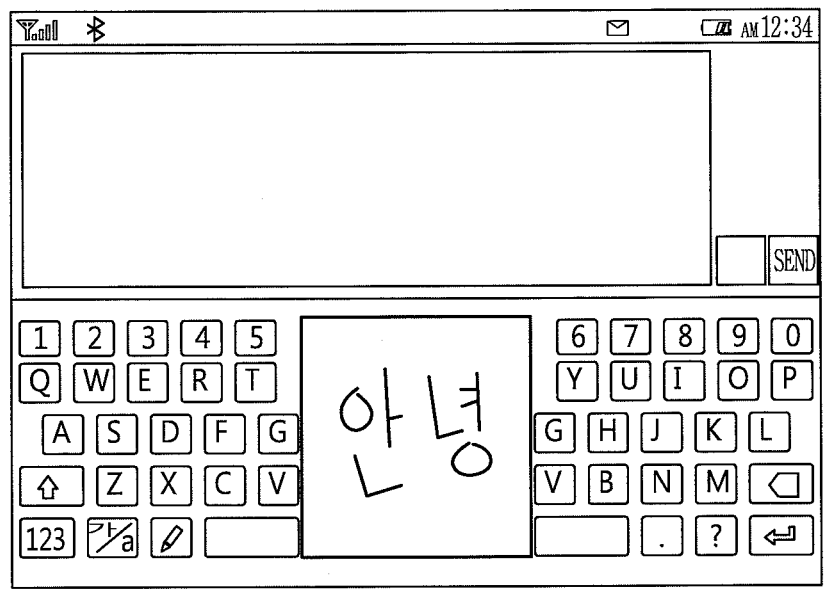

FIGS. 8C and 8D illustrate an interlocking operation when a memo window is displayed. When a note pad is displayed in the first region 210, the controller 180 displays a voice input icon (FIG. 8C) or handwriting window (FIG. 8D) on the display window 230 according to the format of a memo input.

In another embodiment, when content containing text is displayed in the first region 210, the controller 180 changes the layout language of the keypads 220*a*, 220*b* to English when most of the text is English, and changes it to Korean when most of the text is Korean.

Input Scheme Based Interlock

According to an embodiment of the present invention, text may be entered into the first region 100 through the display window 230 based on an input scheme (text, voice and sign language) through the display window 230.

Figure 9:
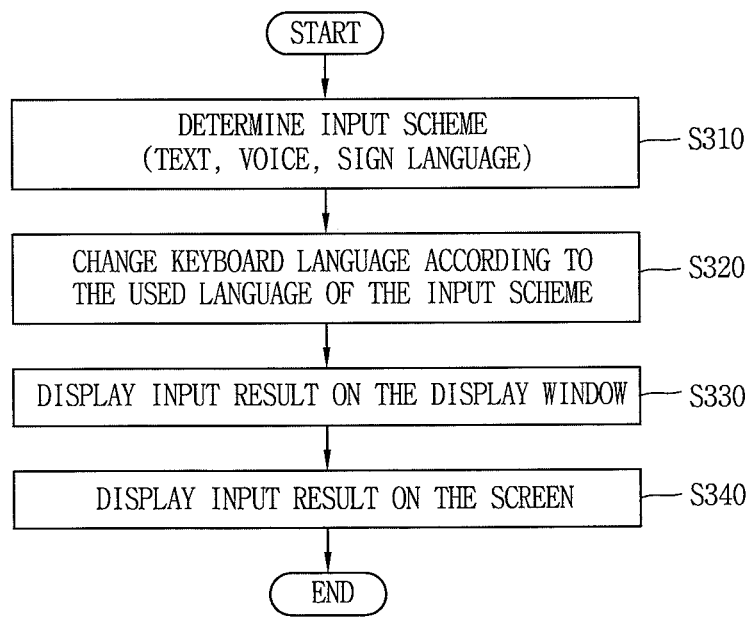
FIG. 9 is a flow chart illustrating an input scheme based interlocking operation.

In particular, FIG. 9 is a flow chart illustrating an input scheme based interlocking operation. As illustrated in FIG. 9, when the display window 230 is displayed by the split of the keypad, the controller 180 determines an input scheme through the display window 230 (S310). The input scheme may include text, a voice, a sign language and other schemes.

When the input scheme is determined, the controller 180 automatically changes the language of the split keypads 220*a*, 220*b* according to the language used for each input scheme (S320), and displays the recognition result in each input scheme on the display window 230 (S330).

The user checks the input result displayed on the input window, and then finally enters it into the screen if there is no abnormality, and modifies the relevant portion and then finally enters it into the screen if an error occurs (S340).

Figure 10A:
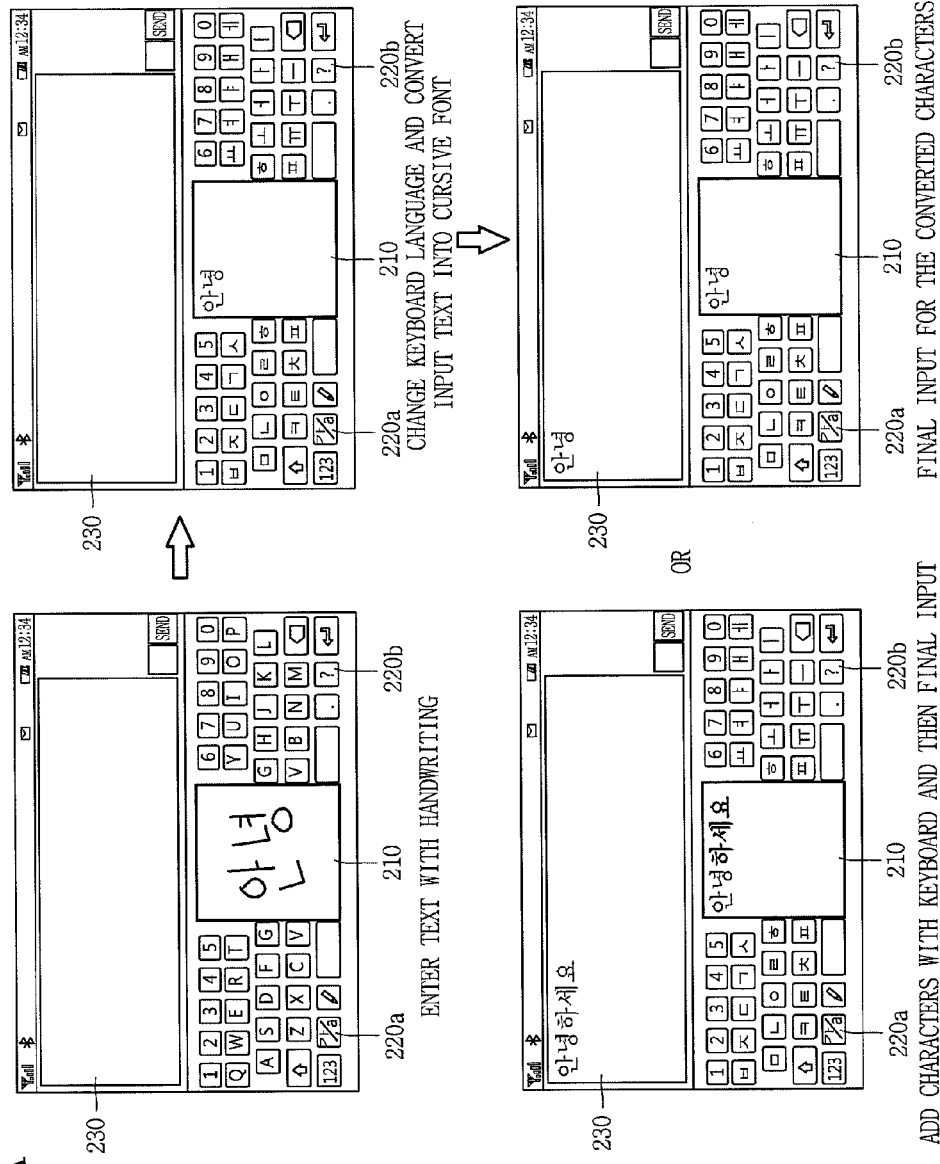
FIGS. 10A through 10C are views illustrating a specific embodiment of an input scheme based interlocking operation.
Figure 10B:
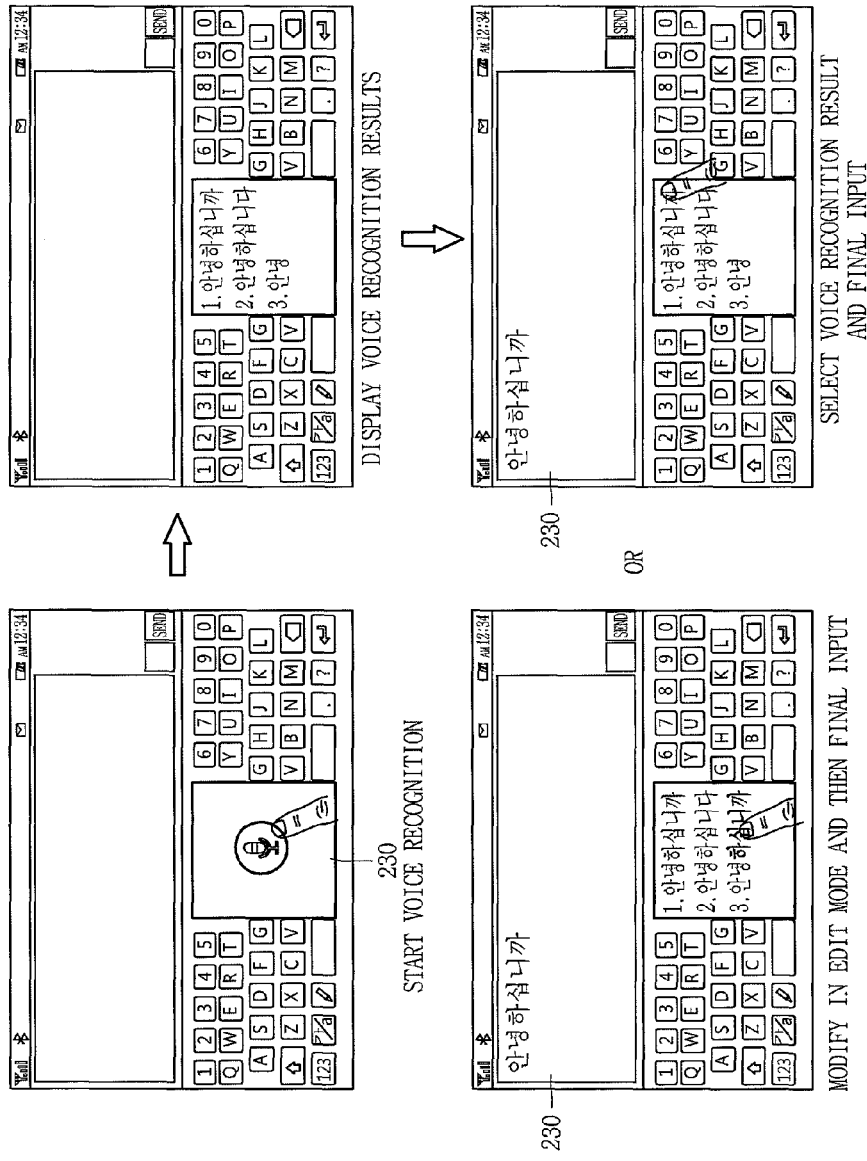
Figure 10C:
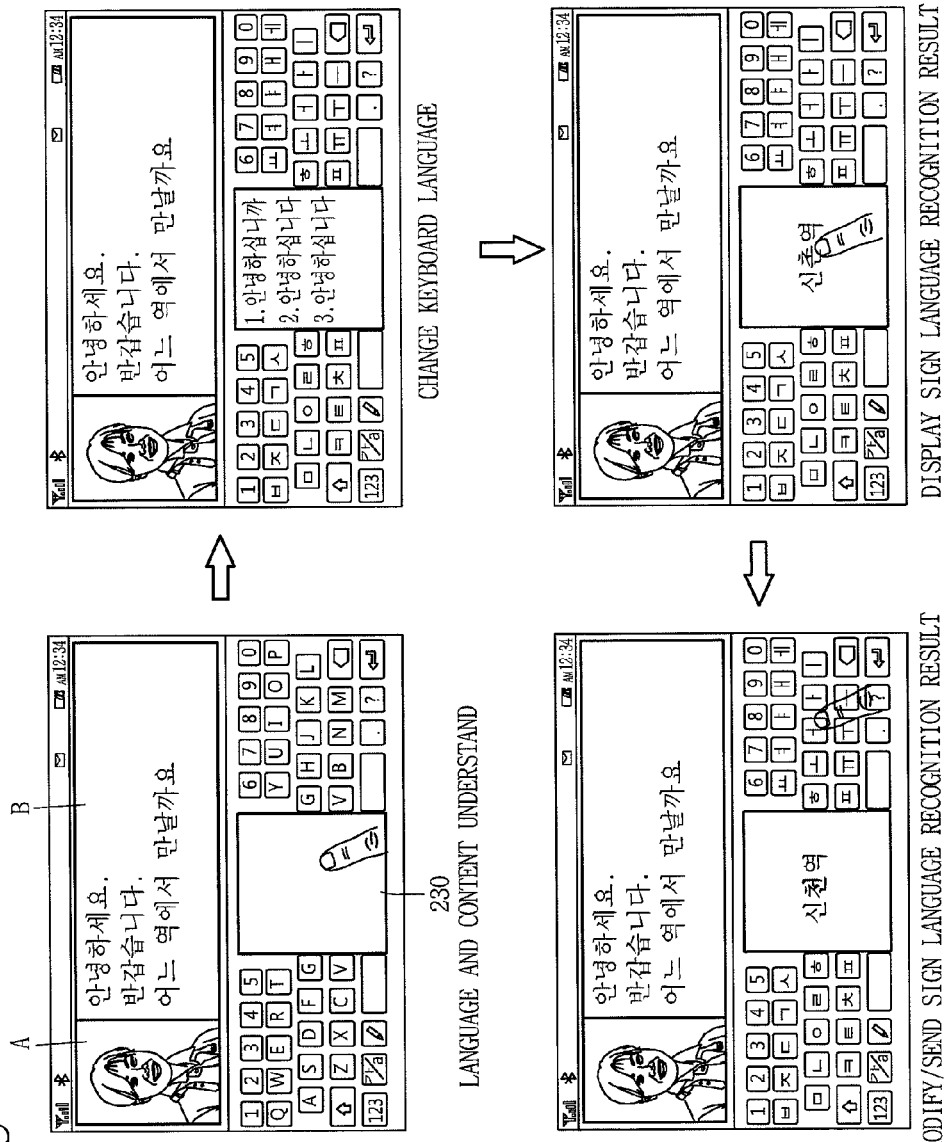

Next, FIGS. 10A through 10C are views illustrating a specific embodiment of an input scheme based interlocking operation. In particular, FIG. 10A is an example of a message input using handwriting.

As illustrated in FIG. 10A, when the basic keypad is split when the message window 210 is displayed in the first region, the display window 230 is displayed. Since a message window for writing a message is displayed on the current screen, the display window 230 is used as a handwriting window.

When the user writes predetermined text (for example, 안녕) on the display window 230, the controller 180 determines the input text to change the layout information of the split keypads 220*a*, 220*b*. For example, the layout is changed to a Korean layout, when Korean is entered and changed to an English layout when English is entered, and automatically changed to a symbol layout when a symbol is entered.

When the language of the keypad is changed, the controller 180 converts text entered into the display window into a cursive font (English cursive or Korean cursive font). At this time, when there is a typing error in the converted text, the user can touch the relevant position and then modify it through additional handwriting. The modification process will be described later in detail.

When cursive text displayed on the input window is selected by the user, the controller 180 finally enters the relevant text (e.g., 안녕) into the message window 210. In particular, the user can select a cursive font displayed on the display window 230 to enter additional text ("하세요") using the keypad prior to entering it into the message window 210. The additional text may be also entered through the keypads 220*a*, 220*b* or handwriting.

Next, FIG. 10B is an example of a message input using voice. First, it is assumed that a message window 210 is displayed in the first region, the split keypads 220*a*, 220*b* are displayed in the second region, and the display window 230 is displayed in the third region.

When the user selects a voice recognition function when the message window 210 is displayed, the display window 230 is used as a voice input window. When the voice recognition function is selected, the controller 180 displays a voice icon on the display window 230, and the user selects the voice icon to start voice recognition. When the voice recognition is started, the controller 180 determines the user's spoken language using the user's voice and characteristics for each language contained in prestored voices, and automatically converts the language of the keypads 220a, 220b into the determined spoken language. As an example, when a Korean is spoken while an English keypad is displayed, the English keypad is automatically converted into the Korean keypad.

Subsequent to the keypad conversion, the controller 180 displays the voice recognition result on the display window 230. The voice recognition result displays the most proximate "N" results among a plurality of voice recognition results obtained through a voice recognition engine on the display window 230.

Further, the user can touch a specific result among the displayed "N" voice recognition results, which is then entered into the message window 210, and long-touch the most proximate result to activate an editing mode and then enter or modify text using the keypad in the editing mode if the recognition result is wrong. The input modified text is entered into the edit object 210 during the touch.

Next, FIG. 10C is an example of converting a gesture (sign language) into text during the video phone call. During the video phone call or video chatting, the first region is split into an image region (A) and a chatting region (B). The counterpart's image or both the counterpart's image and user's image may be displayed in the video region (A).

The user expresses the content desired to be transferred through a gesture (e.g., sign language), and the controller 180 analyzes the camera image to analyze the current user's sign language (Korean, English) and the content thereof. The sign language analysis refers to a prestored sign language table.

The controller 180 automatically changes the language of the keypad according to the analyzed sign language and then displays the analyzed sign language content (for example, "신촌역") in the form of text on the display window 230. At this time, the display window 230 is used as a text conversion window.

Further, the user selects the sign language content displayed on the display window 230 to send it to the counterpart. If the sign language content displayed on the display window 230 does not correspond to a meaning desired to be transferred, then the user can long-touch the word to be modified ("촌") to convert it into an editing mode and then modify the relevant character ("촌") to "천" through the keypad for transmission.

When the foregoing interlocking operation is performed to enter text into the screen (first region), a typing error may occur in the middle of text. However, text displayed on the screen has a small font size and thus it is difficult to correctly place a cursor at a position at which the typing error occurs, for various languages such as Korean in which characters are entered by the combination of a consonant and a vowel, German containing umlaut signs (Ää, Öö, Üü), and Japanese containing special characters (", °) (for example, ガ, か°), there is a burden that when a typing error occurs in the middle of characters, characters subsequent to the typing error should all deleted to newly write the characters.

According to an embodiment of the present invention, in order to solve the foregoing burden, a typing error correction function can be performed through the display window 230 created during the keypad modification (split or slide), thereby correcting the typing error in a convenient and efficient manner. As an event for displaying a typing error displayed in the screen (first region) on the display window 230 in an enlarged manner, a touch operation such as double click, long touch, circle the relevant region, touch & drag, and the like may be used.

The correction of the typing error may be performed by moving a cursor in the unit of phoneme for correction or performing a removal and correction through handwriting.

Next, FIG. 11 is a flow chart illustrating a typing error correction method through a display window. As illustrated in FIG. 11, the controller 180 displays text entered by the user through the keypads 220a, 220b or display window 230 on the screen (S410).

When a specific typing error is selected from the displayed text, the controller 180 displays the selected typing error in an enlarged manner on the display window 230 (S430). The user may immediately correct the typing error displayed in an enlarged manner on the display window 230 (in case of English) or move a cursor in the unit of phoneme (Korean) for correction (Korean), or delete a typing error portion through handwriting and then enter characters for correction (applicable to all languages) (S440). When the typing error correction is completed, the controller 180 displays the corrected characters on the screen according to the user's selection (S450).

Figure 12:
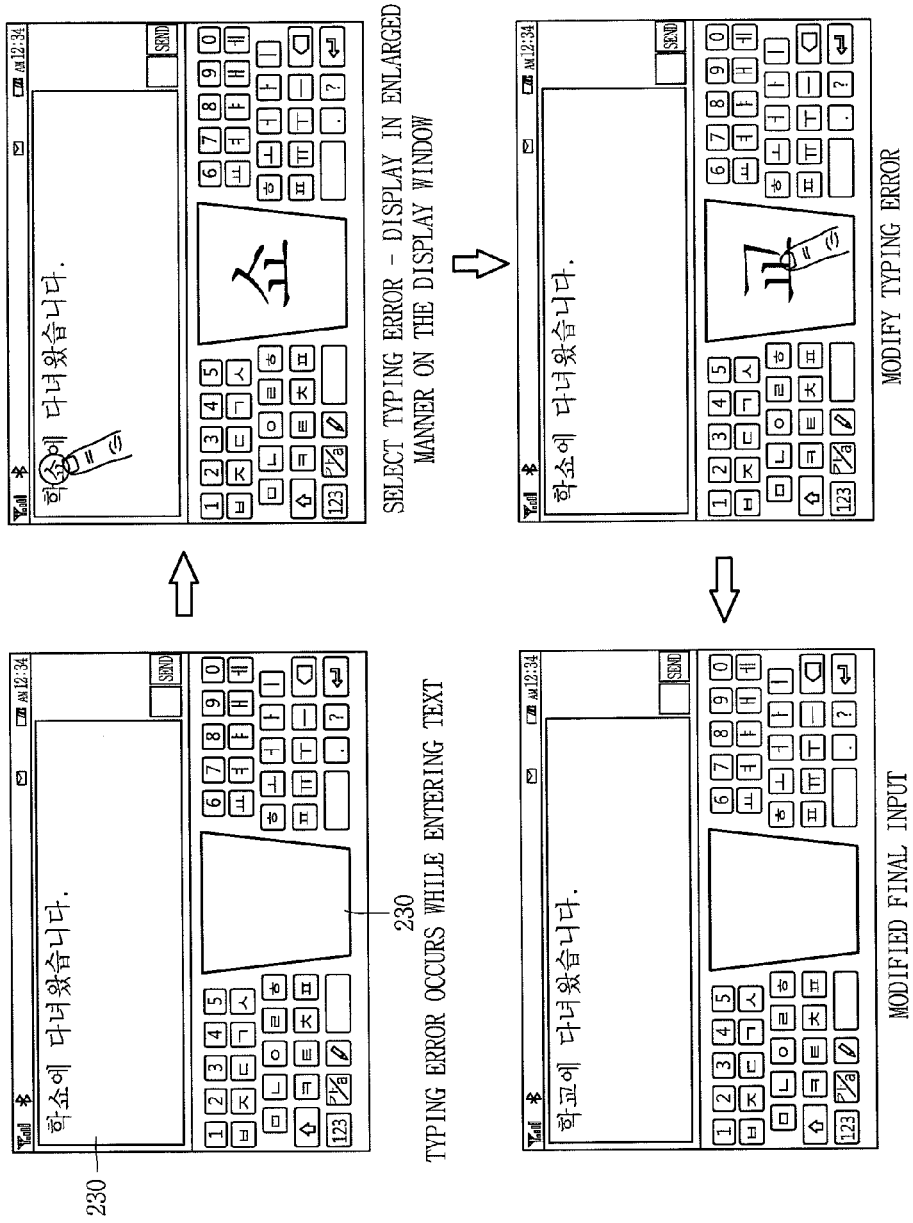
FIG. 12 is a view illustrating an example of a typing error correction method according to the embodiment of FIG. 11.

FIG. 12 is a view illustrating an example of a typing error correction method according to the embodiment of FIG. 11. As illustrated in FIG. 12, when the user enters text, for example, "학교에 다 녀왔습니다", into the message input window 210 of the first region, a typing error may occur in the middle portion (for example, "쇼") thereof.

When the user selects the relevant typing error ("쇼"), the controller 180 displays the selected character "쇼" in an enlarged manner on the display window 230. Then, the user modifies the typing error "쇼" displayed on the display window 230 to "교", and when the modified character is selected, the controller 180 finally enters the modified character "교" into the message input window 210, thereby completing the error correction.

Figure 13A:
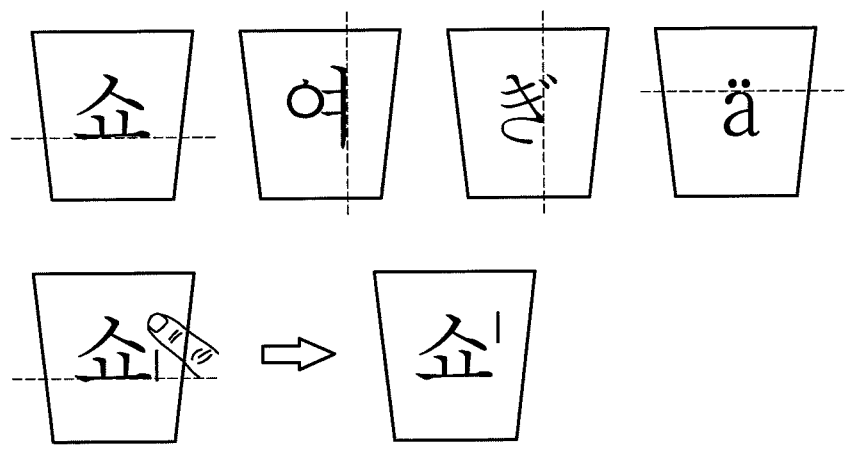
FIGS. 13A and 13B are views illustrating an example of moving a cursor in the unit of phoneme to correct a typing error as an embodiment of the typing error correction method of FIG. 12.
Figure 13B:
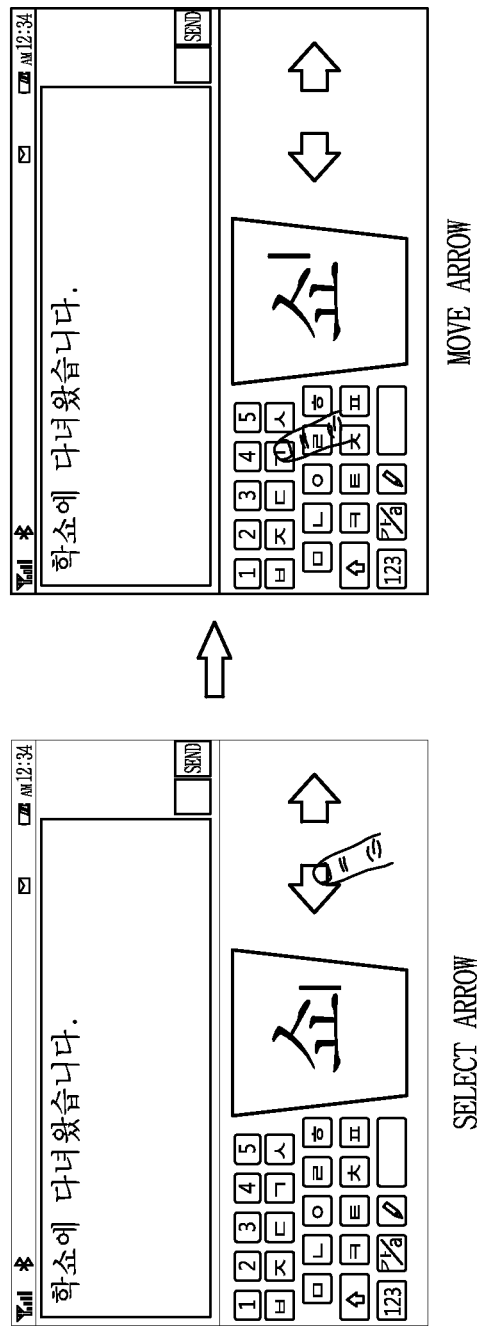

FIGS. 13A and 13B are views illustrating an example of moving a cursor in the unit of phoneme to correct a typing error as an embodiment of the typing error correction method of FIG. 12. The foregoing method includes moving a cursor in the unit of phoneme and then removing a portion at which a typing error occurs and then entering the portion again using the keypad, and the core of the example is to move the location of the cursor.

As illustrated in FIG. 13A, when a typing error is displayed on the display window 230 of the third region in an enlarged manner, the initial location of the cursor is always located subsequent to the last phoneme. In this state, when a specific phoneme region is touched by a finger, the cursor is located subsequent to the touched phoneme.

Once the cursor is located subsequent to a phoneme, the user deletes the relevant phoneme, for example, "ㅅ" in case of "쇼", to select "ㄱ", to modify "쇼" to "교". In particular, for German containing umlaut signs (Ää, Öö, Üü) and Japanese containing special characters (", °) (for example, ガ, か°), it is possible to move the cursor in the unit of syllable in addition to the unit of phoneme as illustrated in FIG. 12A. The rule is also applicable to other languages with the same form in a similar manner.

FIG. 13B is a view illustrating another example of moving a cursor in the unit of phoneme to correct a typing error as an embodiment of the typing error correction method of FIG. 12. As illustrated in FIG. 13B, when a typing error is displayed on the display window 230 of the third region in an enlarged manner, a keypad is displayed at one side of the second region and arrows are displayed at the other side thereof. Such a layout structure is when the user enters text with his or her right hand while holding the terminal with his or her left hand, and the controller 180 automatically displays the layout structure according to the gripping direction during the typing error correction.

According to the layout structure, the user performs cursor movement in the unit of phoneme using an arrow. When the cursor is moved in the unit of phoneme (consonant-vowel unit), the controller 180 changes the layout of the keypad according to whether the location that should be modified is a consonant location or vowel location.

For example, when the location that should be modified is the consonant "ㅅ", the keypad at the left side is automatically changed to a consonant layout as illustrated in FIG. 13B. Accordingly, the user can select "ㄱ" on the changed consonant layout to conveniently modify the typing error "쇼" to "교".

Figure 14A:
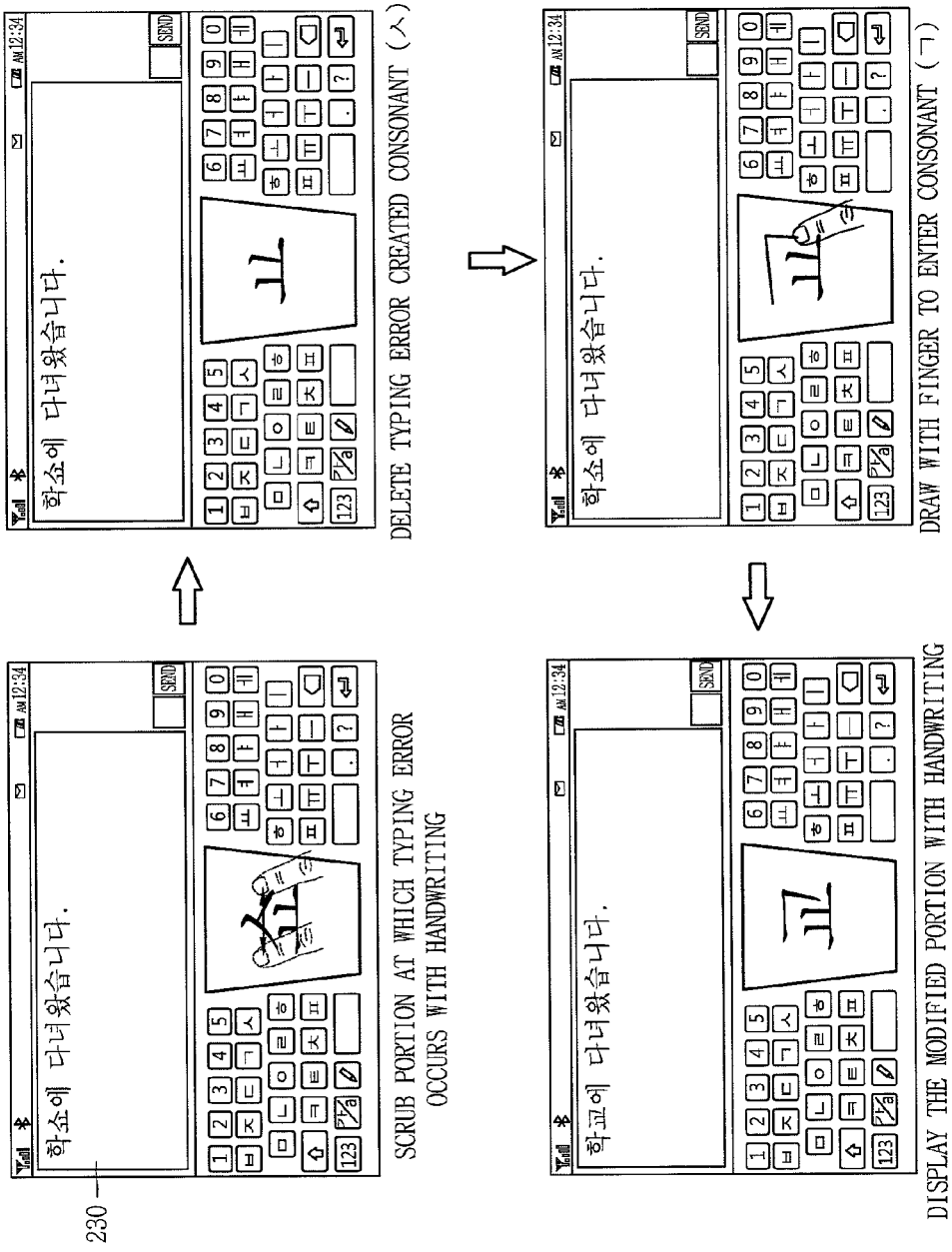
FIGS. 14A through 14D are views illustrating an example of correcting a typing error using handwriting as a specific embodiment of the typing error correction method of FIG. 12.
Figure 14B:
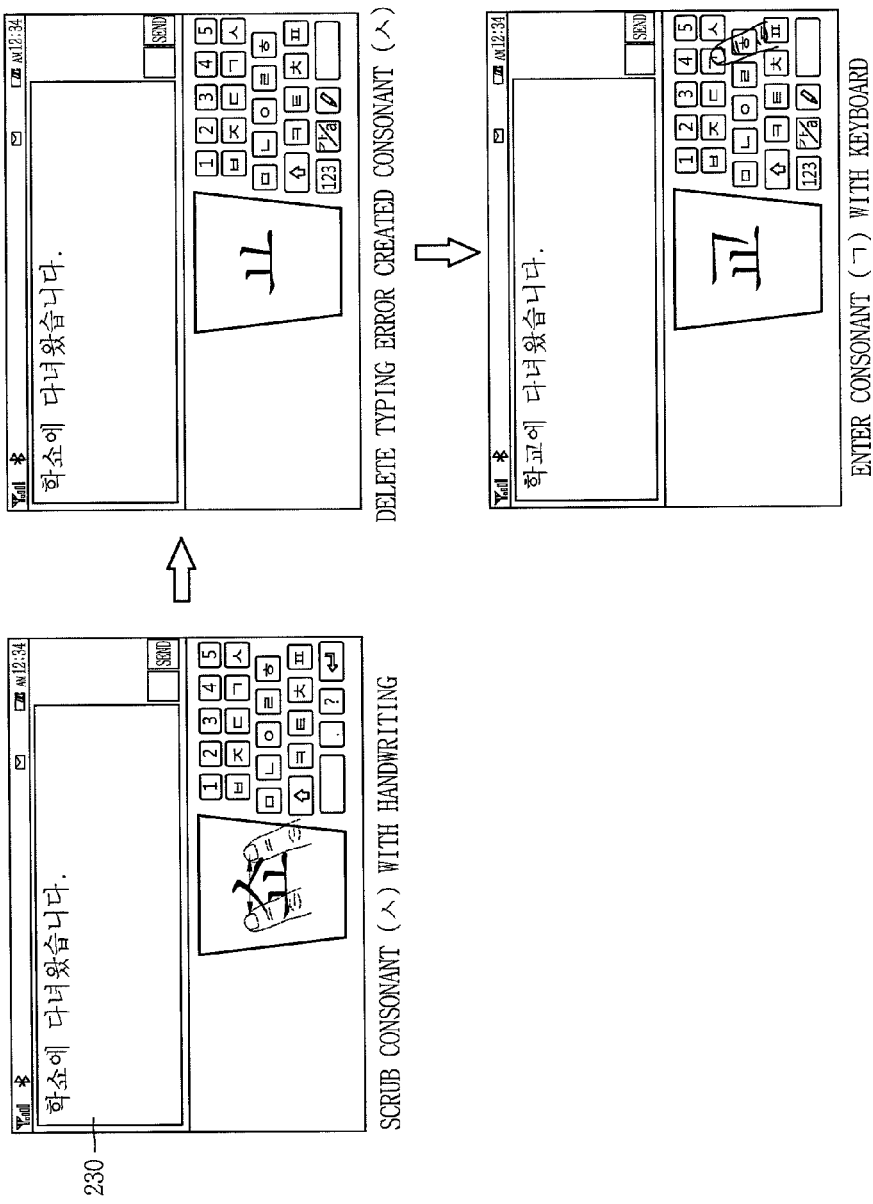

Next, FIGS. 14A and 14B are views illustrating an example of deleting a typing error portion and entering a new phoneme with handwriting to correct the typing error as an embodiment of the typing error correction method of FIG. 12.

As illustrated in FIG. 14A, the user deletes a phoneme at which a typing error occurs by scrubbing it with his or her finger and then when "ㄱ" is directly entered into the deleted portion with handwriting, the controller 180 recognizes it as a cursive script and then displays the typing error corrected "교".

However, when the user scrubs the phoneme "ㅅ" with his or her left finger while holding the terminal with his or her right hand, the controller 180 senses the gripping direction through a grip sensor or gyro sensor and then changes the keypad at the right side to a consonant keypad. Otherwise, the left keypad is changed to a consonant keypad. Accordingly, the user selects a consonant "ㄱ" from the consonant keypad at the right side to conveniently modify the typing error "쇼" to "교".

Figure 14C:
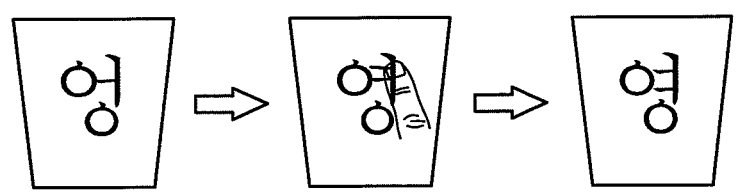
Figure 14D:
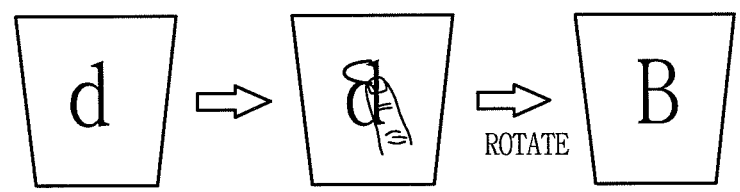

FIGS. 14C and 14D are views illustrating an example of conveniently modifying a typing error using handwriting. As illustrated in FIG. 14C, for example, when it is desired to modify "엉어" to "영어", the user adds a line to the vowel "ㅓ", and the controller 180 recognizes the added line as a cursive script to modify and display the vowel "ㅓ" to "ㅕ". The foregoing method has an advantage that a typing error can be corrected using handwriting with no movement and deletion in the unit of phoneme.

Furthermore, as illustrated in FIG. 14D, when a predetermined shape is drawn with handwriting on an alphabet letter "d" displayed in an enlarged manner on the display window 230 and then the modified letter is rotated, the controller 180 displays a cursive alphabet letter "B". The typing error correction method has an advantage in that the user can conveniently modify a typing error without erasing the relevant character.

FIGS. 15A and 15B illustrate an interlock between the first and third regions and the second region as an example of a keypad operation method according to a content analysis within an image.

The foregoing embodiment is an example in which when selecting a specific region of the image (picture, PDF, PPT) to enter or modify content, the use object of the keypad varies according to the content of the selected region. In other words, the controller 180 modifies the keypad layout to the relevant language when the selected region is composed of only text as illustrated in FIG. 15A, and modifies it to a drawing tool as illustrated in FIG. 15B.

When the specific region is selected, the controller 180 activates the display window 230 and keypads 220a, 220b at the same time. In other words, when a specific portion is selected, the controller 180 changes the keypad to a drawing tool or automatically changes the language of the keypad according to the content (picture, character) in the selected portion while displaying the selected region in an enlarged manner on the display window 230.

In general, the keypad change is not performed according to the relevant language when producing, entering and modifying a video subtitle. Furthermore, when a lot of pictures are taken, or when pictures are sorted for each specific region, specific anniversary or the like, the title of the relevant picture should be changed one by one. In other words, since a gallery screen is switched to a text screen to hide the entire screen when changing the title of the picture, there is a burden that the user should repeat a photo select-title input operation.

According to an embodiment of the present invention, there is provided a scheme capable of easily performing the display of a subtitle d and its related keypad change using a display window and easily changing the title of the selected picture in the gallery in order to overcome the foregoing disadvantages.

Figure 16A:
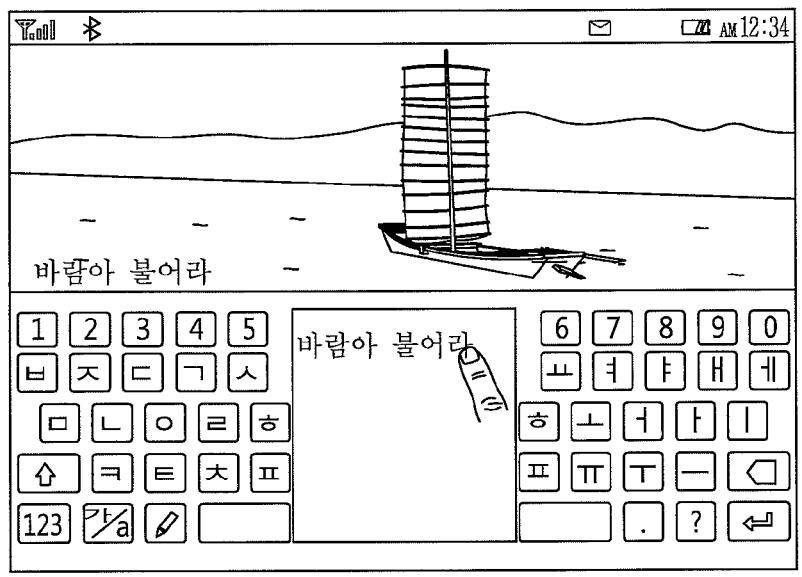
FIGS. 16A and 16B are views illustrating another keypad operation method according to a video/image analysis.
Figure 16B:
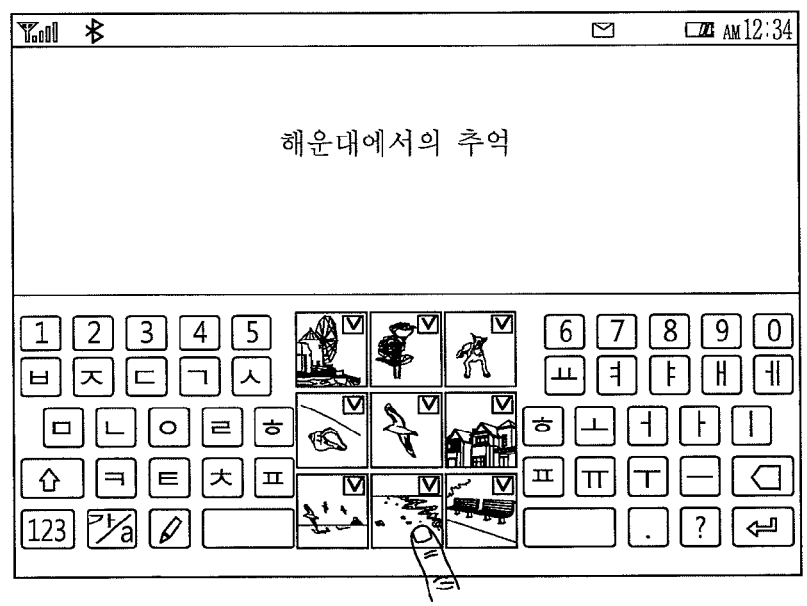

FIGS. 16A and 16B are views illustrating another keypad operation method according to a video/image analysis. As illustrated in FIG. 16A, when the screen is touched while reproducing video 210 in the first region, the controller 180 activates the keypad. When the keypad is split, the controller 180 displays the display window 230 of the second region (central region), and displays a subtitle on the display window. If there is no subtitle in the video, the controller 180 creates a subtitle through voice recognition to display it on the display window 230.

When a subtitle displayed on the display window 230 is touched, the controller 180 automatically changes the language of the keypad to the language of the relevant subtitle, and moves it to a reproduction section of the video. Furthermore, as illustrated in FIG. 16B, when changing the title of a picture when the picture 210 stored in the gallery is displayed in the first region, a basic keypad is displayed in the second region. When the basic keypad is split, the controller 180 displays a plurality of pictures 210 on the display window 230.

All pictures taken at a specific place or selected specific pictures may be displayed on the display window 230. In other words, when the keypad is split when a picture is not selected, the controller 180 displays a plurality of pictures on the display window 230 to select a specific picture and then if the keypad is split, then only the picture is displayed.

The user may change and store a plurality of pictures displayed on the display window 230 or the selected pictures with a collective title. For example, when entering a title for a plurality of pictures or the selected pictures (e.g., memories at Haeundae), all the pictures are changed to the "title+sequence" (memories at Haeundae 1, 2, . . . ). Furthermore, the user may change the title by selecting the pictures one by one.

As described above, according to an embodiment of the present invention, when a keypad is modified (split or slid) for the convenience of a text input for a predetermined application or content while displaying the keypad when the application or content is displayed on the screen, a display window may be displayed in a vacant space created by the split, thereby more effectively entering text with an interlock between the application or content and the keypad using the display window.

Furthermore, according to an embodiment of the present invention, the display window may be used to enter and display text, voice and sign languages according to the type of a predetermined application or content as well as to perform a correction function for the predetermined application or content, thereby more effectively entering text.

In addition, according to an embodiment of the present invention, the foregoing method may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented via a carrier wave (for example, transmission via the Internet). The computer may include the controller of the terminal.

The configurations and methods according to the above-described embodiments will not be applicable in a limited way to a modified keypad operation method in a mobile terminal, and all or part of each embodiment may be selectively combined and configured to make various modifications thereto.

What is claimed is:

1. A method of controlling a mobile terminal, the method comprising:
displaying, on a display of the mobile terminal, an application screen of an executing application and a corresponding keypad;
modifying, via a controller of the mobile terminal, the keypad into a new keypad arrangement;
displaying, via the controller, a display window in a vacant space created by the modification of the keypad, wherein a function of the display window is automatically selected based on a type of the executing application;
automatically changing a language of the modified keypad according to the type of the executing application;
displaying, on the displayed application screen, text input through the display window and modified keypad;
when content is selected from the executing application and displayed on the display window, adaptively changing the language or layout of the modified keypad according to a type of the selected content displayed on the display window;
enlarging a typing error that occurred on the application screen on the display window;
correcting the enlarged typing error displayed on the display window; and
displaying the corrected typing error on the application screen,
wherein correcting the enlarged typing error comprises:
moving a cursor in a unit of a phoneme on the enlarged typing error, the unit of the phoneme including a consonant-vowel unit;
changing the layout of the modified keypad based on a consonant location or vowel location at which the cursor is located; and
deleting the phoneme at which the cursor is located and correcting the enlarged typing error displayed on the display window by entering a new phoneme through the changed layout of the modified keypad, and
wherein the cursor is located subsequent to the last phoneme when the typing error is displayed on the display window in an enlarged manner.

2. The method of claim 1, wherein the modifying the keypad includes splitting the keypad into at least first and second keypads, and the display window is displayed between the first and second keypads.

3. The method of claim 1, wherein the modifying the keypad includes sliding the keypad to at least one side of the display, and the display window is displayed on one side of the modified keypad.

4. The method of claim 1, wherein the automatically selected function of the display window includes one of a handwriting function, a voice function and a motion function.

5. The method of claim 1, wherein the function of the display window is automatically selected based on the type of the executing application including content of the executing application and a language of text displayed on the executing application.

6. The method of claim 1, further comprising:
executing a voice recognition function according to a user's selection to obtain a user's voice;
determining, via a voice recognition function on the mobile terminal, a type of language spoken into a microphone of the mobile terminal using language characteristics contained in the obtained user's voice and prestored voices;
automatically converting a language of the modified keypad to match the type of language spoken; and
displaying text in the display window corresponding to the language spoken into the microphone.

7. The method of claim 1, wherein correcting the enlarged typing error comprises:
removing a phoneme at which the typing error occurs using handwriting on the display window and using handwriting to draw a new phoneme.

8. A mobile terminal, comprising:
a display configured to display an application screen of an executing application and a corresponding keypad;
a memory configured to store the application and the corresponding keypad; and
a controller connected to the display and the memory, and configured to:
modify the keypad into a new keypad arrangement,
display a display window in a vacant space created by the modification of the keypad, wherein a function of the display window is automatically selected based on a type of the executing application,
automatically change a language of the modified keypad according to the type of the executing application,
display text on the displayed application screen through the display window and modified keypad, and
when content is selected from the executing application and displayed on the display window, adaptively changing the language or layout of the modified keypad according to a type of the selected content displayed on the display window,
wherein the controller is further configured to:
enlarge a typing error that occurred on the application screen on the display window,
move a cursor in a unit of a phoneme on the enlarged typing error, the unit of the phoneme including a consonant-vowel unit,
change the layout of the keypad based on a consonant location or vowel location at which the cursor is located, delete the phoneme at which the cursor is located and correct the enlarged typing error displayed on the display window by entering a new phoneme through the changed layout of the modified keypad, and display the corrected typing error on the application screen.

9. The mobile terminal of claim 8, wherein the controller is further configured to modify the keypad by splitting the keypad into at least first and second keypads, and to display the display window between the first and second keypads.

10. The mobile terminal of claim 8, wherein the controller is further configured to modify the keypad by sliding the keypad to at least one side of the display, and to display the display window on one side of the modified keypad.

11. The mobile terminal of claim 8, wherein the automatically selected function of the display window includes one of a handwriting function, a voice function and a motion function.

12. The mobile terminal of claim 8, wherein the controller is further configured to automatically select the function of the display window based on the type of the executing application including content of the executing application and a language of text displayed on the display window.

13. The mobile terminal of claim 8, wherein the controller is further configured to:

execute a voice recognition function according to a user's selection to obtain a user's voice;

determine a type of language spoken into a microphone of the mobile terminal using language characteristics contained in the obtained user's voice and prestored voices;

automatically convert a language of the modified keypad to match the type of language spoken, and display text in the display window corresponding to the language spoken into the microphone.

* * * * *